US009759806B2

(12) United States Patent
Kishigami

(10) Patent No.: US 9,759,806 B2
(45) Date of Patent: Sep. 12, 2017

(54) RADAR APPARATUS

(71) Applicant: Panasonic Corporation, Osaka (JP)

(72) Inventor: Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 14/421,124

(22) PCT Filed: Jun. 6, 2014

(86) PCT No.: PCT/JP2014/003023
§ 371 (c)(1),
(2) Date: Feb. 11, 2015

(87) PCT Pub. No.: WO2014/199609
PCT Pub. Date: Dec. 18, 2014

(65) Prior Publication Data
US 2015/0204966 A1 Jul. 23, 2015

(30) Foreign Application Priority Data

Jun. 13, 2013 (JP) ................................. 2013-124978

(51) Int. Cl.
*G01S 3/74* (2006.01)
*G01S 7/03* (2006.01)
*G01S 7/02* (2006.01)
*G01S 13/42* (2006.01)
*G01S 13/32* (2006.01)
*G01S 13/02* (2006.01)
*G01S 13/26* (2006.01)
*G01S 3/16* (2006.01)
*G01S 3/28* (2006.01)
*G01S 3/14* (2006.01)

(52) U.S. Cl.
CPC ................ *G01S 7/03* (2013.01); *G01S 3/74* (2013.01); *G01S 7/02* (2013.01); *G01S 13/02* (2013.01);
(Continued)

(58) Field of Classification Search
CPC ... G01S 3/02; G01S 3/14; G01S 3/143; G01S 3/16; G01S 3/28; G01S 3/74; G01S 13/26; G01S 13/325; G01S 13/42
(Continued)

(56) References Cited

U.S. PATENT DOCUMENTS 7,495,605 B1 *  2/2009 Sakamoto ................ G01S 3/74
                                                  342/118
8,102,309 B2 *  1/2012 Nakagawa ................ G01S 3/74
                                                  342/147
(Continued)

FOREIGN PATENT DOCUMENTS

JP  2006-145251 A  6/2006
JP  2007-298503 A  11/2007
JP  2012-225688 A  11/2012

OTHER PUBLICATIONS

International Search Report dated Jul. 8, 2014, for corresponding International Application No. PCT/JP2014/003023, 2 pages.
(Continued)

*Primary Examiner* — Peter Bythrow
(74) *Attorney, Agent, or Firm* — Seed Intellectual Property Law Group LLP

(57) ABSTRACT

A radar receiver (Rx) receives a reflected wave signal corresponding to a radar transmitting signal having been reflected on a target by using a plurality of antenna system processors (D1 to D4), and estimates an arrival direction of the reflected wave signal. A peak frequency selector (21) selects a peak value of a correlation vector. An adjacent time-frequency component extractor (22) extracts correlation vectors in number of (NE×NT−1) corresponding to NE Doppler frequencies and NT times respectively adjacent to a Doppler frequency and a time giving a peak value. A correlation matrix generating adder (23) generates a correlation matrix corresponding to correlation of the reflected wave signal received by a plurality of receiver antennas on the basis of the (NE×NT) extracted correlation vectors.

10 Claims, 16 Drawing Sheets

(52) U.S. Cl.
CPC ............ *G01S 13/26* (2013.01); *G01S 13/325* (2013.01); *G01S 13/42* (2013.01); *G01S 3/143* (2013.01); *G01S 3/16* (2013.01); *G01S 3/28* (2013.01)

(58) Field of Classification Search
USPC .......................................................... 342/189
See application file for complete search history.

(56) References Cited

U.S. PATENT DOCUMENTS

| | | | | |
|---|---|---|---|---|
| 2002/0126045 | A1* | 9/2002 | Kishigami | G06K 9/0057 342/417 |
| 2011/0050500 | A1* | 3/2011 | Shirakawa | G01S 3/74 342/378 |
| 2012/0268316 | A1* | 10/2012 | Kanamoto | G01S 3/74 342/158 |
| 2012/0293358 | A1* | 11/2012 | Itoh | G01S 3/74 342/107 |
| 2013/0127655 | A1 | 5/2013 | Kishigami et al. | |

OTHER PUBLICATIONS

Kikuma et al., "Performance Analysis of Unitary Capon Method for DOA Estimation with High Computational Efficiency," WE3-5, Proceedings of ISAP2005, Seoul, Korea, pp. 313-316.
K. C. Huarng et al., "A Unitary Transformation Method for Angel-of-Arrival Estimation," IEEE Transactions on Signal Processing 39(4):975-977, 1991.

* cited by examiner

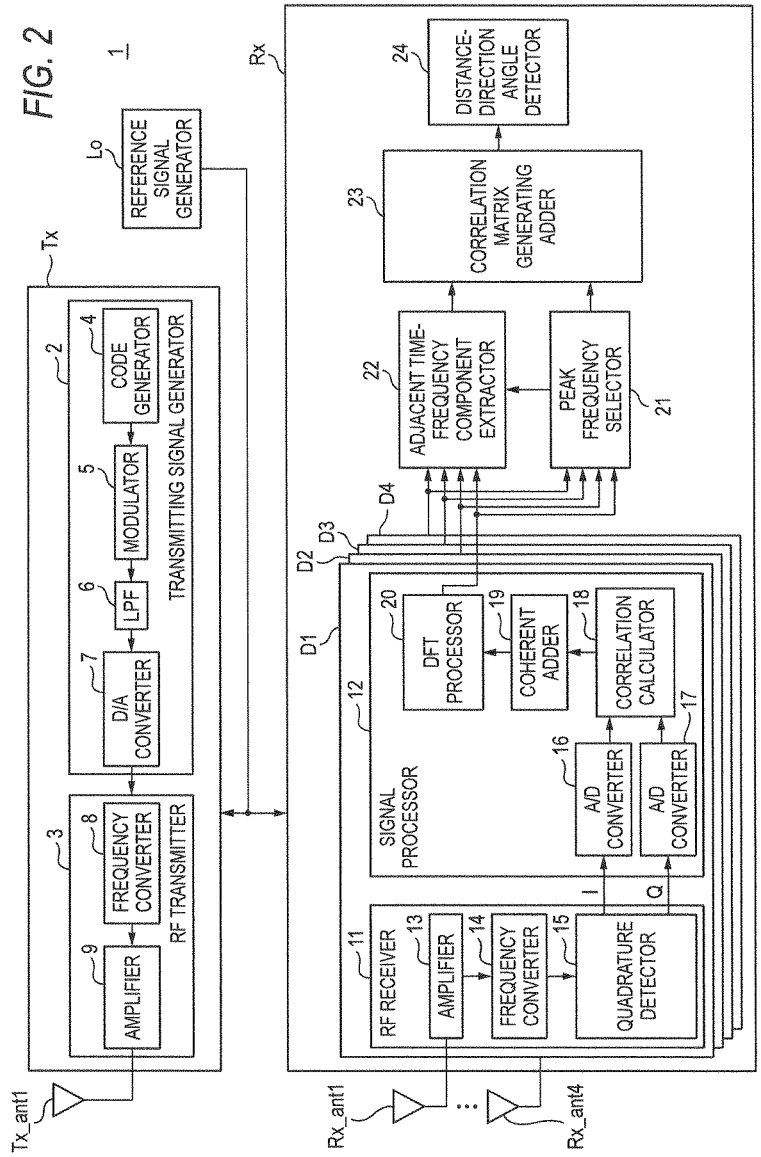

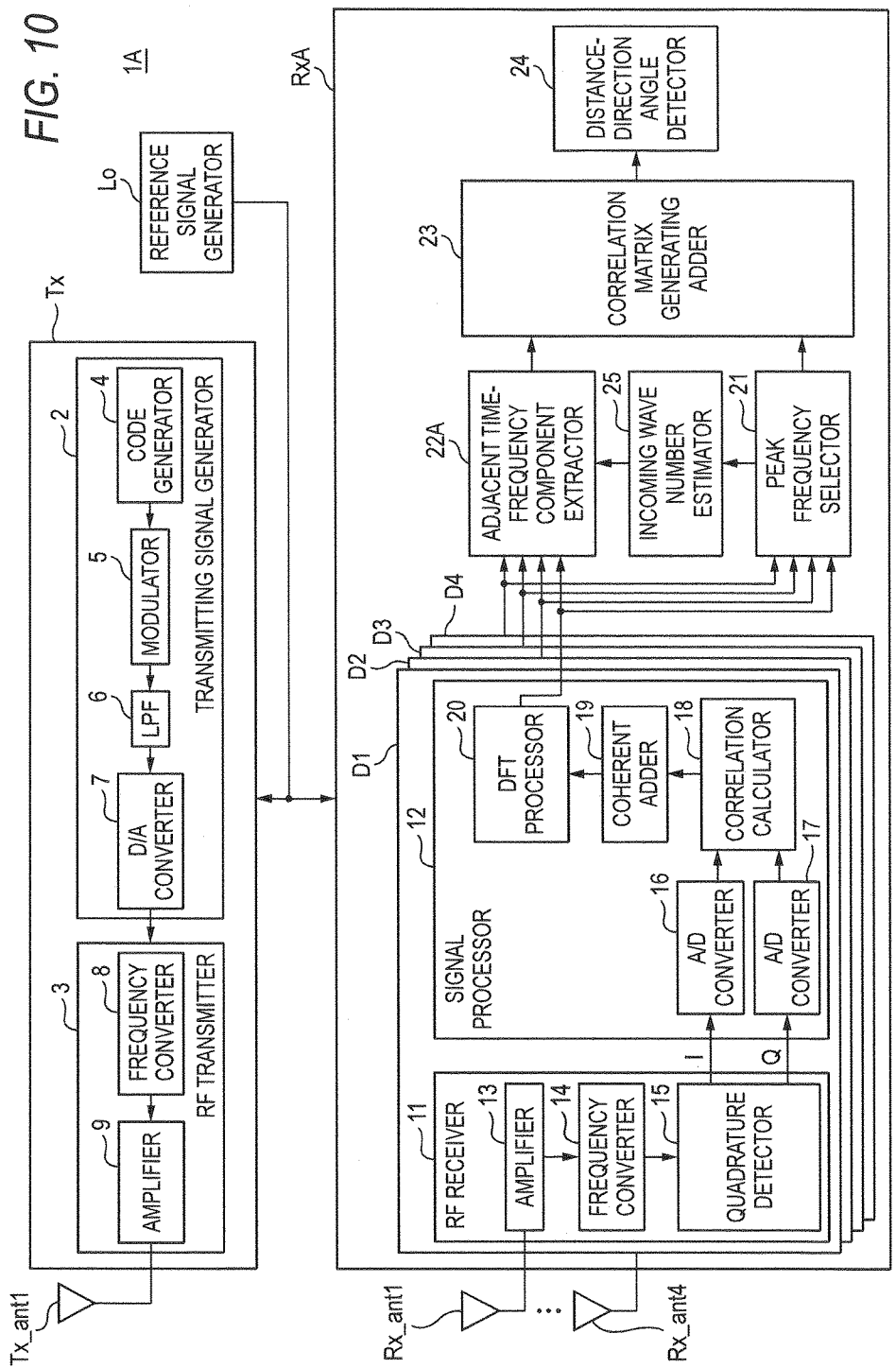

RADAR APPARATUS

TECHNICAL FIELD

The present disclosure relates to a radar apparatus for detecting a distance or a direction to a target on the basis of a reflected wave signal having been reflected on the target.

BACKGROUND ART

A radar apparatus that receives a reflected wave signal having been reflected on a target with an array antenna and measures a phase difference between signals received by respective receiver antennas so as to estimate an arrival direction with resolution higher than the main beam width of the receiver array antenna is known.

As a known method for estimating an arrival direction based on a phase difference between received signals received by an array antenna in a conventional radar apparatus, for example, the Fourier technique, the Capon method and the like are known. In employing the Fourier technique, the radar apparatus calculates a correlation matrix of received signals received by respective receiver antennas, and estimates, as the arrival direction, an azimuth at which an evaluation function using the correlation matrix gives a peak value. Alternatively, in employing the Capon method, the radar apparatus calculates an inverse matrix of a correlation matrix of received signals received by respective receiver antennas, and estimates, as the arrival direction, an azimuth at which an evaluation function using the inverse matrix of the correlation matrix gives a peak value.

As a related art for estimating an arrival direction of radio waves by using a correlation matrix obtained from received signals received by an array antenna, for example, Patent Document 1 is known. A radio wave arrival direction estimating device disclosed in Patent Document 1 specifies a beat frequency at which a frequency spectrum of a beat signal obtained by each of a plurality of receiver antennas has a peak value, and extracts not only a frequency spectrum of the specified beat frequency at which the peak value is attained but also a prescribed number of frequencies (target frequencies) belonging to the same peak waveform.

The radio wave arrival direction estimating device generates individual correlation matrixes by using reception vectors obtained by arranging sampling data of the same target frequency sampled from FFT results of all received channels, and the individual correlation matrixes are further subjected to weighted addition and averaging to generate an average correlation matrix. The radio wave arrival direction estimating device obtains an arrival direction of reflected waves received by the respective receiver antennas, namely, a direction where a target to be detected is present, by MUSIC (Multiple Signal Classification) method using the average correlation matrix.

In this manner, the radio wave arrival direction estimating device can secure, in a short time, the number of snapshots necessary for generating an average correlation matrix in which correlation between incoming waves is sufficiently suppressed without increasing the number of antennas and receivers, and hence, the accuracy in estimating a radio wave arrival direction can be improved without increasing the device scale or production cost.

RELATED ART DOCUMENT

Patent Document

Patent Document 1: JP-A-2006-145251

DISCLOSURE OF THE INVENTION

Problems to be Solved by the Invention

The radio wave arrival direction estimating device of Patent Document 1 generates individual correlation matrixes with a beat frequency giving a peak on a beat frequency spectrum and frequencies in the vicinity of the peak inclusively used as target frequencies, and further generates an average correlation matrix by averaging or weighted addition averaging (weighted averaging) the individual correlation matrixes.

Therefore, when the frequency spectrum in the vicinity of the beat frequency corresponding to a peak is not sufficiently wide in the beat frequency spectrum, an individual correlation matrix of a beat frequency having a low reception level is included in the average correlation matrix, and hence, the signal to noise ratio (SNR) of each component of the average correlation matrix is degraded, resulting in causing a problem in which the accuracy in estimating the direction is degraded.

On the other hand, the number of frequencies included in the width of the frequency spectrum in the vicinity of the beat frequency giving a peak can be increased by increasing the frequency resolution, so as to inhibit an individual correlation matrix of a beat frequency having a low reception level from being included in the average correlation matrix, but the FFT size in calculating the beat frequency spectrum is thus increased, which leads to a problem in which the circuit scale is increased.

An object of the present disclosure is to provide, for solving the aforementioned conventional problems, a radar apparatus in which the accuracy in estimating a direction of a radar reflected wave from a target is improved without increasing a circuit scale by performing direction estimation with a correlation matrix generated by using a signal component group that is highly correlated with reflected wave signal components from the target and has good SNR.

Means for Solving the Problems

The present disclosure provides a radar apparatus including: a radar transmitter that converts a transmitting signal into a high frequency radar transmitting signal and transmitting the radar transmitting signal from a transmission antenna; and a radar receiver that receives, by a plurality of receiver antennas, a reflected wave signal corresponding to the radar transmitting signal having been reflected on a target, and estimates an arrival direction of the reflected wave signal by using a plurality of antenna system processors for generating signals including correlation vectors between the reflected wave signal and the transmitting signal, and the radar receiver includes: a correlation vector extractor that extracts a maximum value of the signals including the correlation vectors, and the signals including the correlation vectors in number of (NE×NT−1) corresponding to Doppler frequencies in number of NE (wherein NE represents an integer of 1 or more) and corresponding to times in number of NT (wherein NT represents an integer of 1 or more) respectively adjacent to a Doppler frequency and a time giving the maximum value; and a correlation matrix generator that generates, on the basis of the extracted signals including the correlation vectors in number of (NE×NT), a correlation matrix corresponding to correlation of the reflected wave signal received by the plurality of receiver antennas.

Effects of the Invention

According to the present disclosure, since direction estimation is performed with a correlation matrix generated by using a signal component group highly correlated with reflected wave signal components and having good SNR, the accuracy in estimating the direction of a radar reflected wave from a target can be improved without increasing the circuit scale, and hence, even though reflected waves from a plurality of targets are included, the accuracy in estimating the directions of them can be improved.

BRIEF DESCRIPTION OF DRAWINGS

FIG. 2 is a block diagram illustrating in detail the internal configuration of the radar apparatus of Embodiment 1.

FIG. 10 is a block diagram illustrating in detail the internal configuration of a radar apparatus according to Embodiment 2.

MODE FOR CARRYING OUT THE INVENTION (Details Leading to Contents of Respective Embodiments of a Radar Apparatus of the Present Disclosure)

Figure 14:
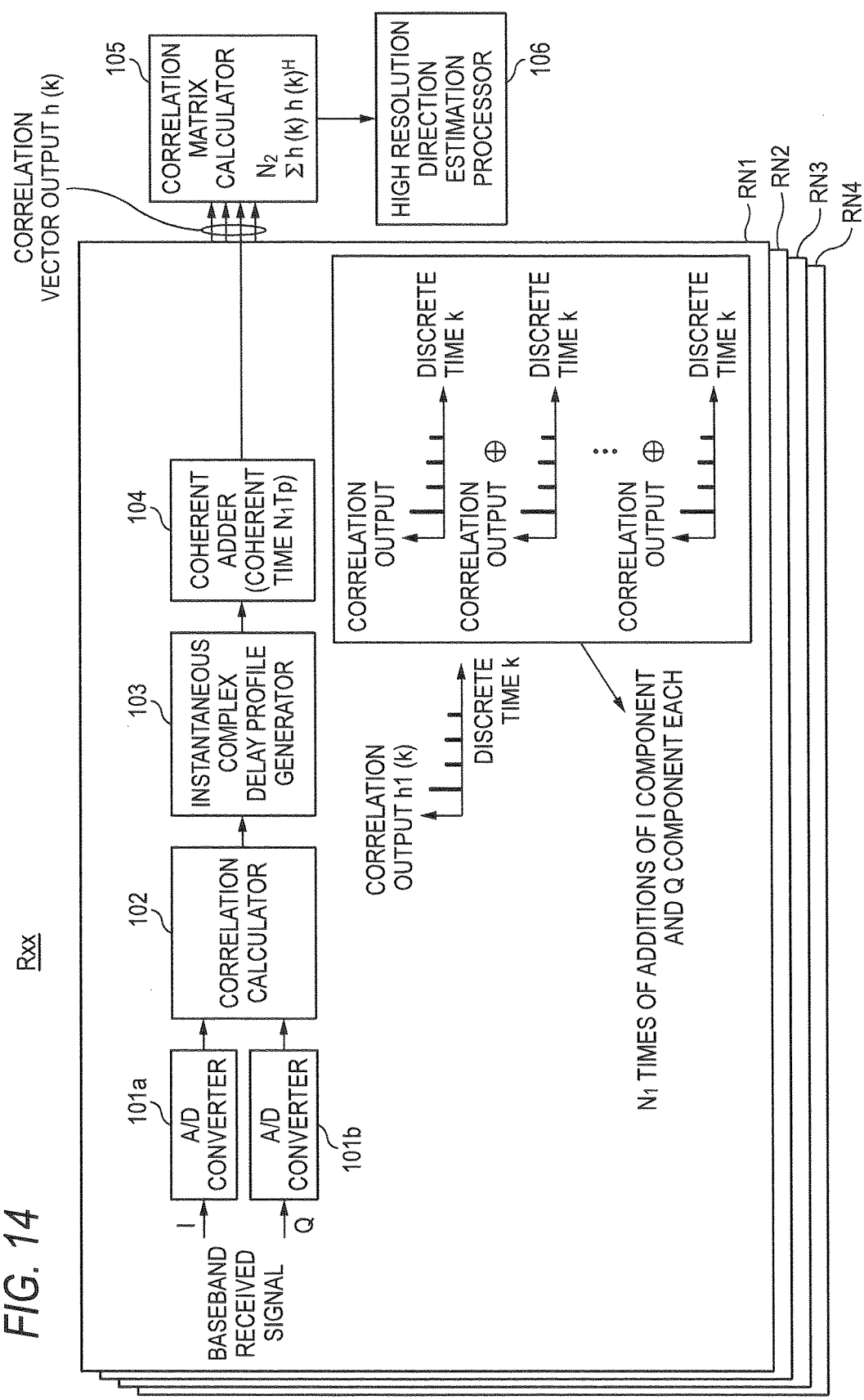
FIG. 14 is an explanatory diagram illustrating a part of the operation flow in a radar receiver of a conventional radar apparatus.

Before describing the contents of each embodiment of a radar apparatus of the present disclosure, details leading to the contents of the respective embodiments of the radar apparatus of the present disclosure will be first described with reference to FIG. 14. FIG. 14 is a diagram explaining a part of an operation flow in a radar receiver Rxx of a conventional radar apparatus.

In employing an arrival direction estimation method with high resolution using a phase difference between received signals received by an array antenna (such as the Capon method or the MUSIC method), it is necessary to calculate a correlation matrix corresponding to correlation among the respective received signals (see FIG. 14).

The radar receiver Rxx of FIG. 14 includes a plurality of antenna system processors RN1, RN2, RN3 and RN4, a correlation matrix calculator 105, and a high resolution direction estimation processor 106. The antenna system processor RN1 includes A/D converters 101a and 101b, a correlation calculator 102, an instantaneous complex delay profile generator 103, and a coherent adder 104. Each of the other antenna system processors RN2 to RN4 has the same configuration as the antenna system processor RN1, and therefore, the antenna system processor RN1 is described as an example with the description of the other antenna system processors RN2 to RN4 omitted.

In the radar receiver Rxx of FIG. 14, an I signal and a Q signal of analog baseband received signals are subjected to A/D conversion in the A/D converters 101a and 101b, and the resultant digital baseband I signal and Q signal are input to the correlation calculator 102. A calculation result of correlation between the received signal and a transmitting signal (not shown) obtained in the correlation calculator 102 is input to the instantaneous complex delay profile generator 103, so as to generate an instantaneous complex delay profile corresponding to the relationship between a discrete time k and a correlation output h1(k).

The coherent adder 104 performs a prescribed number of times $N_1$ of coherent addition of the calculation result of correlation obtained by the correlation calculator 102, and outputs the result of the coherent addition of the $N_1$ times to the correlation matrix calculator 105. The correlation matrix calculator 105 uses the result of the coherent addition of the $N_1$ times supplied from each of the antenna system processors RN1 to RN4 to generate correlation matrixes of $N_2$ times, adds up the generated correlation matrixes, and outputs the result of the addition to the high resolution direction estimation processor 106.

The high resolution direction estimation processor 106 estimates an arrival direction of a reflected wave signal having been reflected on a target on the basis of the correlation matrix generated by the correlation matrix calculator 105 by using a known high resolution estimation method (such as the Capon method or the MUSIC method).

In the case where, for example, the radar apparatus including the radar receiver Rxx of FIG. 14 transmits a pulse radar transmitting signal by N times in every measurement, assuming that the number of coherent additions of the coherent adder 104 for the result of the correlation calculation by the correlation calculator 102 is $N_1$, and that the number of additions of the correlation matrixes by the correlation matrix calculator 105 using a correlation vector h(k) from each of the antenna system processors RN1 to RN4 is $N_2$, $N=N_1 \times N_2$.

Since the result of the coherent addition performed in the coherent adder 104 includes components of an amplitude and a phase of a received signal, in order to maximize a total additional gain G (see expression (1)) in the radar receiver Rxx of FIG. 14, it is necessary that $N_1$ is maximum and $N_2$ is minimum, namely, $N=N_1$ and $N_2=1$. When $N_2$ is increased, for example, from 1 to 8, the total additional gain G is decreased from the maximum value ($N_2=1$) of the total additional gain by $5 \log_{10}(8)=4.5$ [dB].

[Expression 1]

$$G=10 \log_{10}(N_1)+5 \log_{10}(N_2)[dB] \quad (1)$$

On the other hand, when $N_2$ is decreased, the rank of the correlation matrix calculated by the correlation matrix calculator 105 is not sufficient, and hence, when, for example, a plurality of reflected wave signals are received, the reflected wave signals from a plurality of targets cannot be separated from one another in the radar receiver Rxx, resulting in a problem in which the accuracy in estimating an arrival direction is degraded.

Accordingly, in each of the following embodiments, an example of a radar apparatus in which the accuracy in estimating a direction of a reflected wave signal from a target can be improved by securing the rank of a correlation matrix without reducing coherent additional gain will be described.

Now, preferred embodiments of a radar apparatus according to the present disclosure will be described with reference to the accompanying drawings.

(Embodiment 1)

Figure 1:
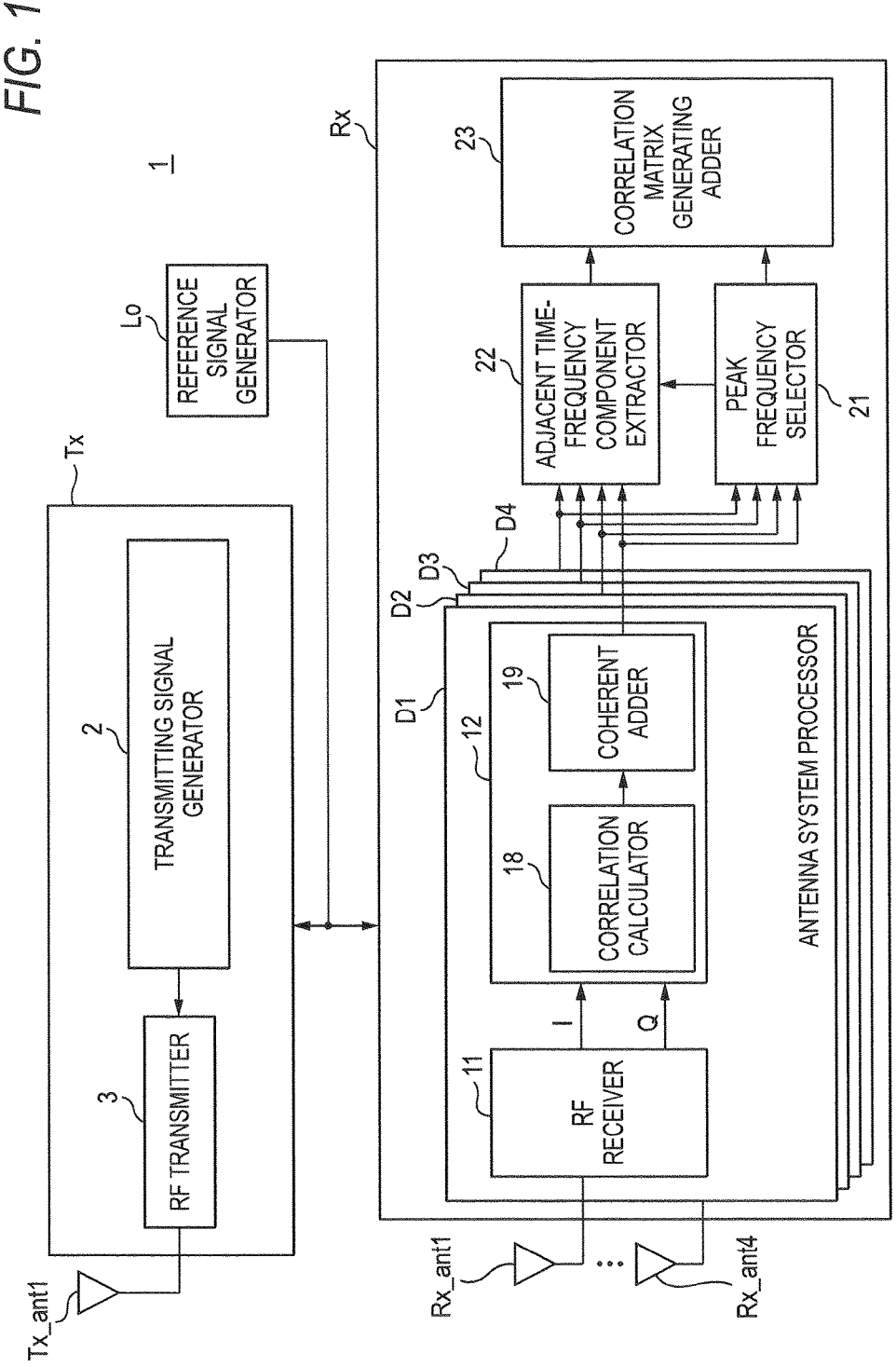
FIG. 1 is a block diagram simply illustrating the internal configuration of a radar apparatus according to Embodiment 1.
Figure 3A:
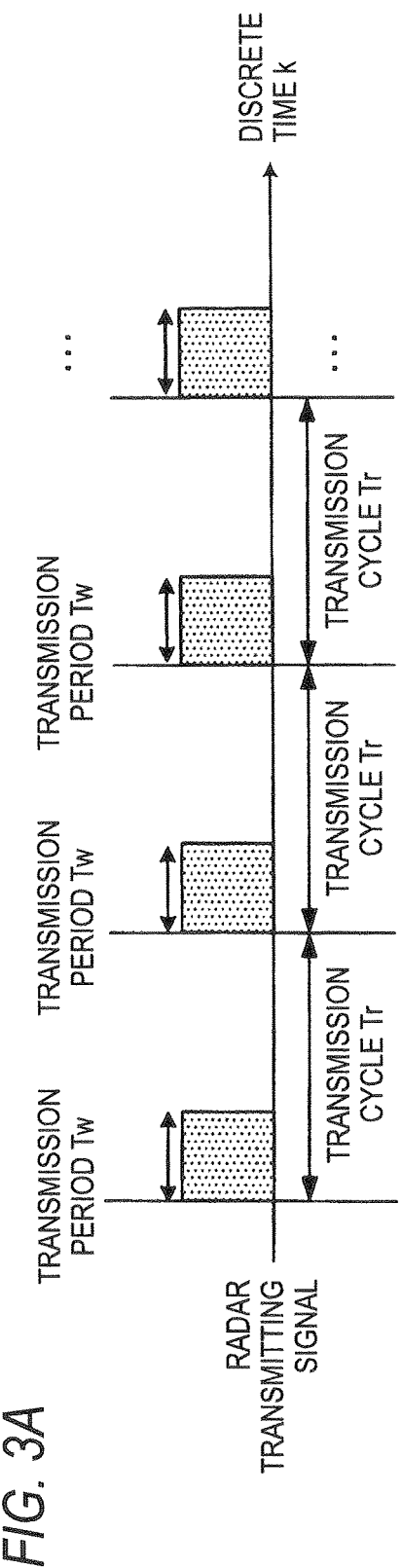
FIG. 3A is a diagram illustrating the relationship between a transmission period and a transmission cycle of a radar transmitting signal.
Figure 3B:
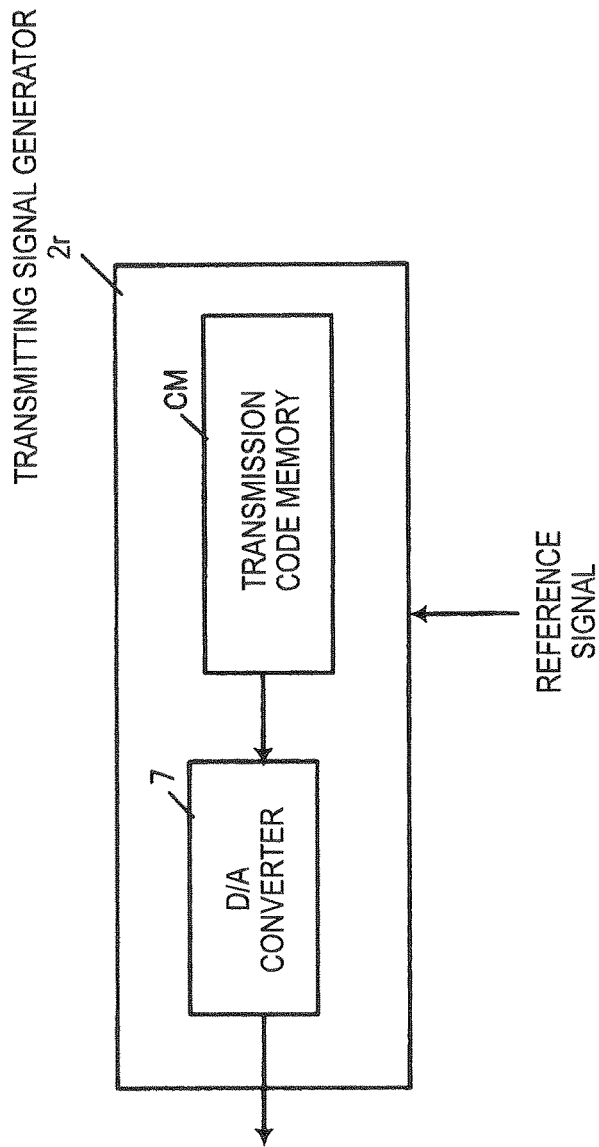
FIG. 3B is a block diagram illustrating the internal configuration of another transmitting signal generator.

The configuration and the operation of a radar apparatus 1 according to Embodiment 1 will be described with reference to FIGS. 1 to 6. FIG. 1 is a block diagram simply illustrating the internal configuration of the radar apparatus 1 according to Embodiment 1. FIG. 2 is a block diagram illustrating in detail the internal configuration of the radar apparatus 1 of Embodiment 1. FIG. 3A is a diagram illustrating the relationship between a transmission period and a transmission cycle of a radar transmitting signal. FIG. 3B is a block diagram illustrating the internal structure of another transmitting signal generator.

The radar apparatus 1 transmits (emits) a high frequency radar transmitting signal generated by a radar transmitter Tx from a transmission antenna Tx_ant1. The radar apparatus 1 receives a reflected wave signal, that is, the radar transmitting signal having been reflected on a target (not shown), by an array antenna (that includes, but not limited to, four receiver antennas Rx_ant1 to Rx_ant4 shown in FIG. 1). The radar apparatus 1 processes the reflected wave signal received by the four receiver antennas Rx_ant1 to Rx_ant4 so as to detect the presence of the target.

Incidentally, the target is an object to be detected by the radar apparatus 1, and includes, for example, an automobile or a human, which also applies to the following embodiments. It is noted that the receiver antennas Rx_ant1 to Rx_ant4 may be receiver antenna elements.

First, the configurations of respective components of the radar apparatus 1 will be simply described.

The radar apparatus 1 of FIG. 1 includes a reference signal generator Lo, the radar transmitter Tx and a radar receiver Rx. The radar transmitter Tx includes a transmitting signal generator 2 and an RF transmitter 3 to which the transmission antenna Tx_ant1 is connected.

The reference signal generator Lo is connected to the radar transmitter Tx and the radar receiver Rx. The reference signal generator Lo supplies a reference signal working as a base signal commonly to the radar transmitter Tx and the radar receiver Rx, so as to synchronize the processes performed by the radar transmitter Tx and the radar receiver Rx with each other.

The radar receiver Rx includes antenna system processors D1, D2, D3 and D4 in number of, for example, four, a peak frequency selector 21, a adjacent time-frequency component extractor 22, and a correlation matrix generating adder 23. Although the radar receiver Rx of FIG. 1 includes, for example, the four antenna system processors D1 to D4, the number of antenna system processors is not limited to four but may be two or more. Each of the antenna system processors has the same configuration, and hence the antenna system processor D1 will be exemplarily described in each of the following embodiments.

The antenna system processor D1 includes an RF receiver 11 to which the receiver antenna Rx_ant1 is connected, and a signal processor 12. The signal processor 12 includes a correlation calculator 18 and a coherent adder 19.

Next, the configurations of the respective components of the radar transmitter Tx will be described in detail with reference to FIG. 2. The radar transmitter Tx of FIG. 2 includes the transmitting signal generator 2 and the RF transmitter 3 to which the transmission antenna Tx_ant1 is connected.

The transmitting signal generator 2 includes a code generator 4, a modulator 5, an LPF (Low Pass Filter) 6 and a D/A (Digital/Analog) converter 7. In FIG. 2, the LPF 6 may be provided outside the transmitting signal generator 2, and the output of the LPF 6 is input to the D/A converter 7. The RF transmitter 3 includes a frequency converter 8 and an amplifier 9.

Next, the operations of the respective components of the radar transmitter Tx will be described in detail.

The transmitting signal generator 2 generates, on the basis of a reference signal generated by the reference signal generator Lo, a transmission reference clock signal by multiplying the reference signal by prescribed times. The respective components of the transmitting signal generator 2 are operated on the basis of the transmission reference clock signal.

A baseband transmitting signal generated by the transmitting signal generator 2 is modified by using samples in number of No of the transmission reference clock signal per code of a code sequence $C_n$ with a code length L in, for example, a transmission period Tw [seconds] of a transmission cycle Tr shown in FIG. 3A. Here, n is 1 to L (>0). L (an integer) represents the code length of the code sequence $C_n$.

The sampling rate of the transmitting signal generator 2 is (No×L)/Tx, and the transmitting signal generator 2 performs the modification by using Nr (=No×L) samples in the transmission period Tw [seconds] of the transmission cycle Tr. The transmitting signal generator 2 performs the modification by using Nu samples in a non-signal period (Tr−Tw) [seconds] of the transmission cycle Tr.

The transmitting signal generator 2 periodically generates a baseband transmitting signal r(k, M) represented by expression (2) through the modification of the code sequence $C_n$ with the code length L. Here, j represents an imaginary unit satisfying $j^2=-1$. A time k indicates a discrete time based on the start timing (k=1) of the transmission cycle Tr, and k represents a discrete value from 1 to (Nr+Nu), and refers to a time corresponding to the generation timing of the transmitting signal.

M represents an ordinal number of the transmission cycle Tr of the radar transmitting signal. A transmitting signal r(k, M) refers to a transmitting signal at a discrete time k in the Mth transmission cycle Tr, and is obtained as a result of addition of an in-phase signal component I(k, M) and a quadrate signal component Q(k, M) multiplied by the imaginary unit j (see expression (2)).

[Expression 2]

$$r(k,M)=I(k,M)+jQ(k,M) \quad (2)$$

The code generator 4 generates a transmission code of the code sequence $C_n$ with the code length L. The elements of the code sequence $C_n$ include, for example, two values of [−1, 1] or four values of [1, −1, j, −j]. In order that the radar receiver Rx attains a low side lobe characteristic, the transmission code is preferably a code, for example, including at least one of a code sequence constructing a pair of complementary codes, a Baker code sequence, a PN (Pseudorandom Noise) code, a Golay code sequence, an M sequence code and a code sequence constructing a spano code. The code generator 4 outputs the generated transmission code of the code sequence $C_n$ to the modulator 5. Hereinafter, the transmission code of the code sequence $C_n$ is designated as the transmission code $C_n$ for convenience sake.

When the code generator 4 generates, as the transmission code $C_n$, a pair of complementary codes (such as a Golay code sequence or a Spano code sequence), it uses two transmission cycles (2Tr) for alternately generating the transmission codes $P_n$ and $Q_n$ to be paired in each transmission cycle. In other words, the code generator 4 generates one transmission code $P_n$ out of the pair of complementary codes and outputs it to the modulator 5 in the Mth transmission cycle, and in the next (M+1)th transmission cycle, it generates the other transmission code $Q_n$ out of the pair of complementary codes and outputs it to the modulator 5. Similarly, in transmission cycles following the next (M+2)th transmission cycle, with two transmission cycles of the Mth and the (M+1)th transmission cycles regarded as one unit, the code generator 4 repeatedly generates transmission codes $P_n$ and $Q_n$ and outputs them to the modulator 5.

The modulator 5 pulse-modulates the transmission code $C_n$ generated by the code generator 4, and generates the baseband transmission signal r(k, M) represented by expression (2). The pulse modulation is amplitude modulation, ASK (Amplitude Shift Keying) or phase modulation (PSK (Phase Shift Keying)), which also applies to the following embodiments.

When, for example, the phase modulation (PSK) is employed, the phase modification of the code sequence $C_n$ of, for example, two values of [−1, 1] is BPSK (Binary Phase Shift Keying), and the phase modification of the code sequence $C_n$ of, for example, four values of [1, −1, j, −j] is QPSK (Quadrature Phase Shift Keying) or 4-PSK. In other words, in the phase modulation (PSK), prescribed modulation symbols in the constellation in the IQ plane are allocated.

The modulator 5 outputs, out of transmitting signals r(k, M), a transmitting signal r(k, M) having a frequency equal to or lower than a prescribed limited band to the D/A converter 7 through the LPF 6. Incidentally, the LPF 6 may be omitted in the transmitting signal generator 2, so as to be provided after the D/A converter 7, which also applies to the following embodiments.

The D/A converter 7 converts the digital transmitting signal r(k, M) generated by the modulator 5 into an analog transmitting signal. The D/A converter 7 outputs the analog transmitting signal to the transmitting RF 3.

The RF transmitter 3 generates, on the basis of the reference signal generated by the reference signal generator Lo, a transmission reference signal of a carrier frequency band obtained by multiplying the reference signal by prescribed times. Incidentally, a multiplied signal may be a signal obtained with different multiples between the transmitting signal generator 2 and the RF transmitter 3, or may be a signal obtained with the same multiple. The respective components of the RF transmitter 3 are operated on the basis of the transmission reference signal.

The frequency converter 8 generates a radar transmitting signal of a carrier frequency band (such as the millimeter wave band) by up-converting the transmitting signal r(k, M) generated by the transmitting signal generator 2. The frequency converter 8 outputs the radar transmitting signal to the amplifier 9.

The amplifier 9 amplifies the signal level of the radar transmitting signal generated by the frequency converter 8 into a prescribed signal level, and outputs the amplified signal to the transmission antenna Ant-Tx. The radar transmitting signal amplified by the amplifier 9 is emitted through the transmission antenna Ant-Tx to the space.

The transmission antenna Ant-Tx emits (transmits) the radar transmitting signal generated by the RF transmitter 3 to the space. The radar transmitting signal is transmitted in a transmission period $T_w$ in a transmission cycle $T_r$ and is not transmitted in a non-transmission period ($T_r-T_w$) (see FIG. 3A).

Incidentally, to the RF transmitter 3 and the RF receiver of each of the antenna system processors D1 to D4, the reference signal generated by the reference signal generator Lo is commonly input. The RF transmitter 3 is operated on the basis of the transmission reference signal obtained by multiplying the reference signal by the prescribed times, and the RF receiver of each of the antenna system processors D1 to D4 is operated on the basis of a reception reference signal obtained by multiplying the reference signal by the same multiple as that for the RF transmitter 3. Accordingly, the processes are synchronized between the RF transmitter 3 and the RF receiver of each of the antenna system processors D1 to D4.

Incidentally, instead of using the transmitting signal generator 2 including the code generator 4, the modulator 5 and the LPF 6, a transmitting signal generator 2r including a transmission code memory CM for precedently storing the transmission code $C_n$ generated by the transmitting signal generator 2 may be used (see FIG. 3B).

The transmission code memory CM may store a pair of complementary codes, such as transmission codes $P_n$ and $Q_n$, so as to cope with a case where the transmitting signal generator 2 generates a pair of complementary codes as the transmission code. The configuration of the transmitting signal generator 2r of FIG. 3B may be employed not only in the present embodiment but also in any of the following embodiments. The transmitting signal generator 2r includes the transmission code memory CM and the D/A converter 7.

On the basis of the transmission reference clock signal obtained by multiplying the reference signal generated by the reference signal generator Lo by the prescribed times, the transmission code $C_n$, or the transmission code $P_n$ and the transmission code $Q_n$ paired as complementary codes are cyclically read from the transmission code memory CM in each transmission cycle Tr, so as to be output to the D/A converter 7. The operation to be performed thereafter is the same as the operation of the D/A converter 7 described above, and hence the description will be omitted.

Next, the configuration of respective components of the radar receiver Rx will be described with reference to FIG. 2.

The radar receiver Rx of FIG. 2 includes the four antenna system processors D1 to D4 provided correspondingly to, for example, the number of receiver antennas included in the array antenna, the peak frequency selector 21, the adjacent time-frequency component extractor 22, the correlation matrix generating adder 23, and a distance direction detector 24.

The antenna system processor D1 includes the RF receiver 11 to which the receiver antenna Rx_ant1 is connected, and the signal processor 12. The RF receiver 11 includes an amplifier 13, a frequency converter 14 and a quadrature detector 15. The signal processor 12 includes two A/D converters 16 and 17, a correlation calculator 18, a coherent adder 19 and a DFT processor 20. The radar receiver Rx periodically calculates each transmission cycle Tr of the radar transmitting signal as a signal processing period in the signal processor of each of the antenna system processors D1 to D4.

Figure 4:
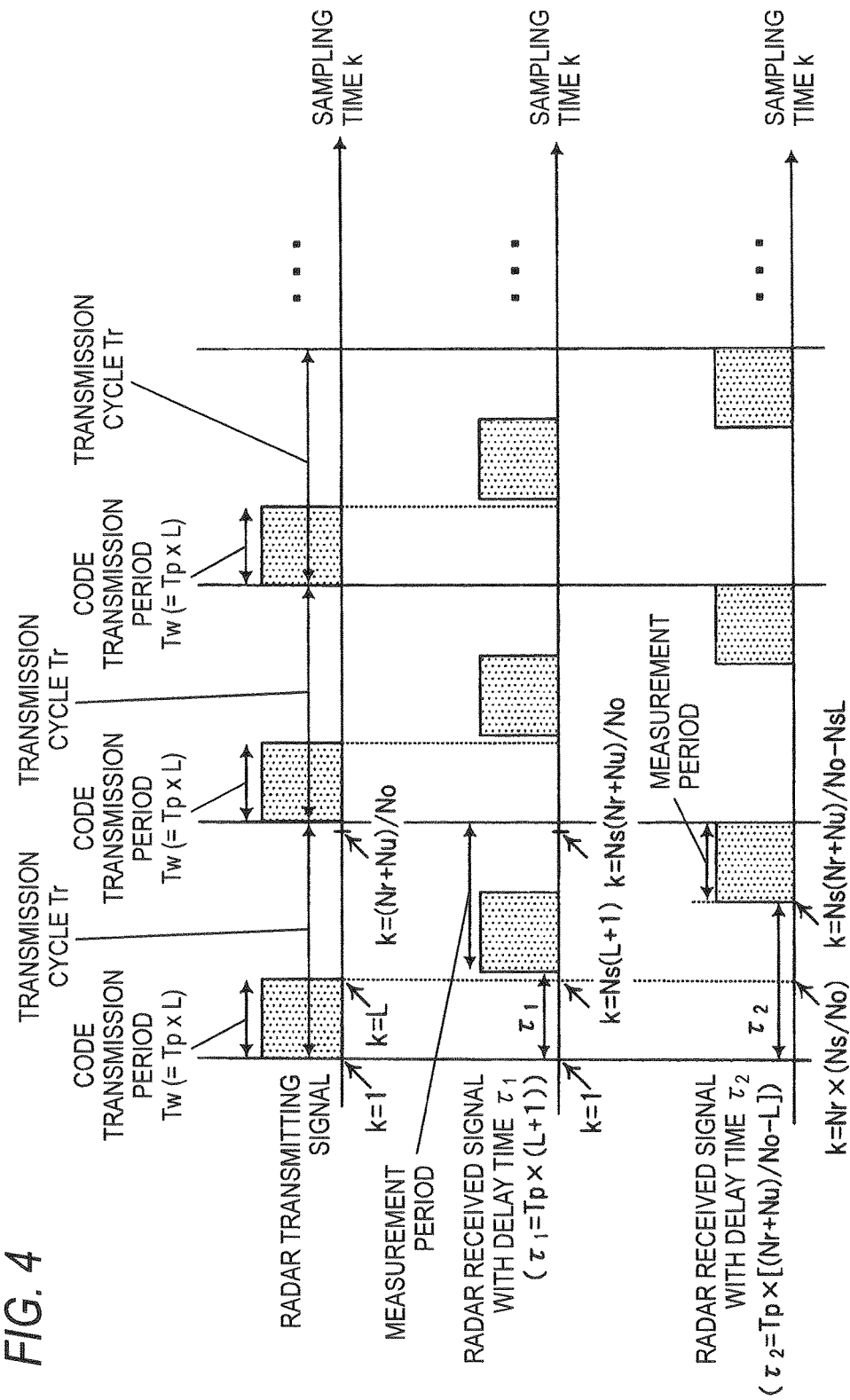
FIG. 4 is a diagram illustrating the relationship among a radar transmitting signal, a radar received signal with a delay time τ1 and a radar received signal with a delay time τ2.
Figures 5A, 5B:
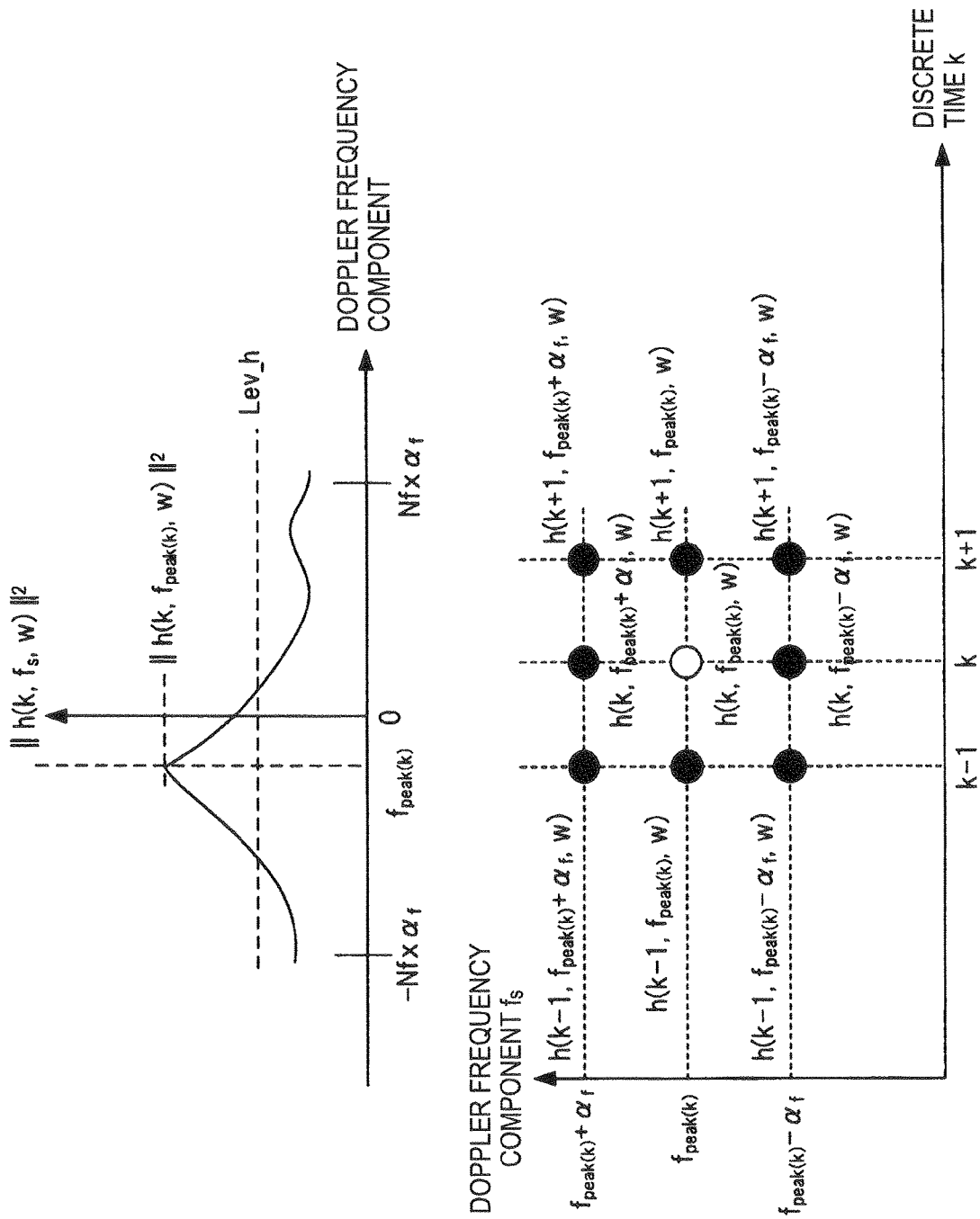
FIG. 5(A) is a diagram explaining an operation of a peak frequency selector.
FIG. 5(B) is a diagram explaining an operation of an adjacent time-frequency component extractor.
Figure 6:
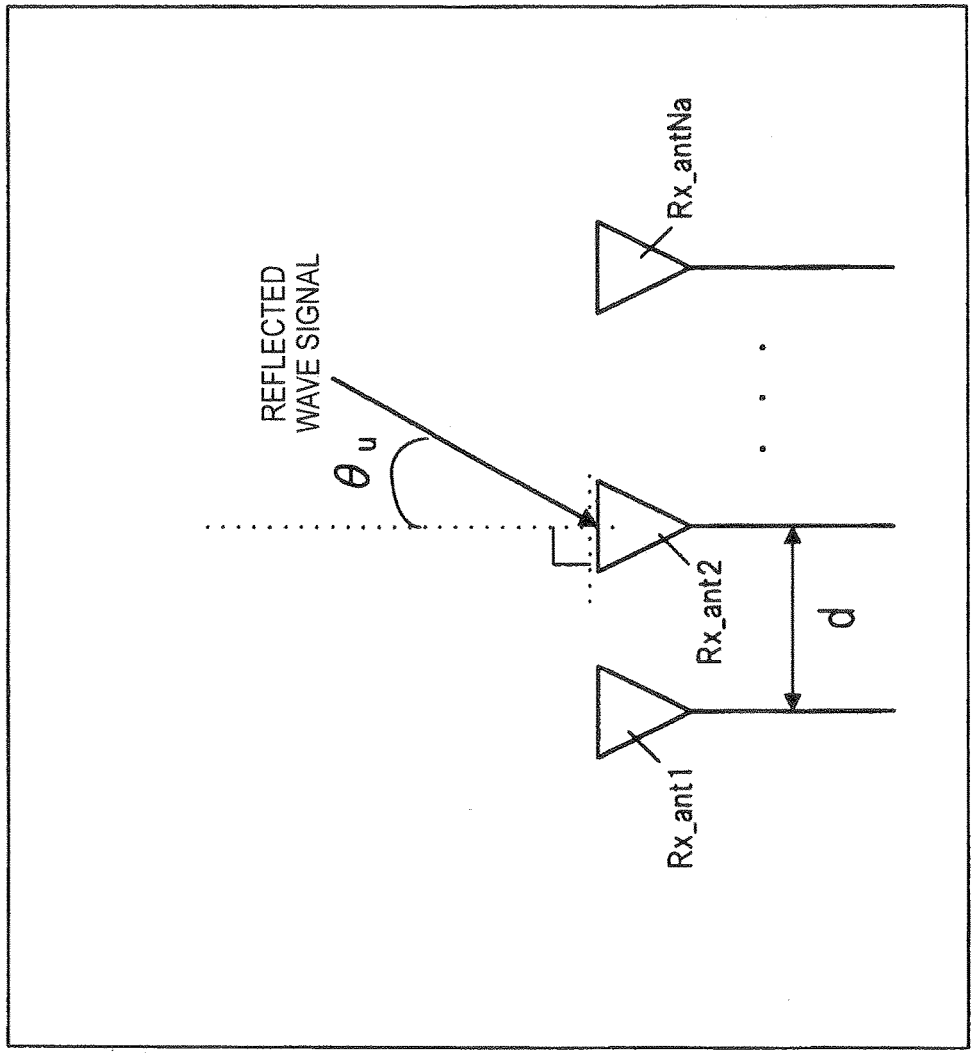
FIG. 6 is a diagram explaining the relationship between arrangement of respective receiver antennas included in an array antenna and an azimuth θ.

Next, the operations of the respective components of the radar receiver Rx will be described in detail with reference to FIG. 2 and FIGS. 4 to 6. FIG. 4 is a diagram illustrating the relationship among the radar transmitting signal, a radar received signal with a delay time τ1 and a radar received signal with a delay time τ2. FIG. 5A is a diagram explaining the operation of the peak frequency selector 21. FIG. 5B is a diagram explaining the operation of the adjacent time-frequency component extractor 22. FIG. 6 is an explanatory diagram illustrating the relationship between the arrangement and an azimuth $\theta_q$ of each of the receiver antennas Rx_ant1 to Rx_ant4.

The receiver antenna Rx_ant1 receives a reflected wave signal of the radar transmitting signal having been transmitted by the radar transmitter Tx and reflected on a target. The high frequency radar received signal received by the receiver antenna Rx_ant1 is input to the RF receiver 11.

Similarly to the RF transmitter 3, the RF receiver 11 generates, on the basis of the reference signal generated by the reference signal generator Lo, a reception reference signal of a carrier frequency band by multiplying the reference signal by prescribed times. The respective components of the RF receiver 11 are operated on the basis of the reception reference signal.

The amplifier 13 amplifies the signal level of the radar received signal received by the receiver antenna Rx_ant1 to a prescribed signal level and outputs the amplified signal to the frequency converter 14.

The frequency converter 14 generates a baseband received signal by down-converting the high frequency radar received signal to a baseband signal by using the radar received signal amplified by the amplifier 13 and the reception reference signal. The frequency converter 14 outputs the baseband received signal to the quadrature detector 15.

The quadrature detector 15 quadrature-detects the baseband received signal generated by the frequency converter 14 to generate a received signal constructed by using an in-phase signal and a quadrate signal. The quadrature detector 15 outputs the in-phase signal, out of the baseband received signal, to the A/D converter 16 and the quadrate signal to the A/D converter 17.

The A/D converter 16 converts the in-phase signal of analog data into digital data by sampling the baseband in-phase signal generated by the quadrature detector 15 at every discrete time k. The A/D converter 16 outputs the obtained in-phase signal component of digital data to the correlation calculator 18.

The A/D converter 16 samples signals in number of Ns per pulse width (pulse time) Tp (=Tw/L) of the transmitting signal r(k, M) generated by the radar transmitter Tx. In other words, the sampling rate of the A/D converter 16 is (Ns× L)/Tw=Ns/Tp, and the over sample number per pulse is Ns.

The A/D converter 17 performs a similar operation to the A/D converter 16 on the baseband quadrate signal generated by the quadrature detector 15, and outputs the resultant quadrate signal component of digital data to the correlation calculator 18. Besides, the sampling rate of the A/D converter 17 is Ns/Tp, and the over sample number per pulse is Ns.

Hereinafter, a baseband received signal at a discrete time k of the Mth transmission cycle Tr obtained as the outputs of the A/D converter 16 and 17 is expressed as a complex signal x(k, M) of expression (3) by using an in-phase signal component Ir(k, M) and a quadrate signal component Qr(k, M).

[Expression 3]

$$x(k,M)=Ir(k,M)+jQr(k,M) \quad (3)$$

In the first row of FIG. 4, transmission timing of the radar transmitting signal is illustrated. In the first row of FIG. 4, the signal processor 12 periodically performs its operation with a time period from the discrete time k=1, namely, the start timing of each transmission cycle Tr, to k=Ns (Nr+ Nu)/No, namely, the sampling timing up to before the end of the transmission cycle Tr, used as a signal processing period.

Specifically, the signal processor 12 periodically performs its operation during the discrete time k=1 to Ns(Nr+Nu)/No (see the second row of FIG. 4). The second row of FIG. 4 illustrates reception timing of a radar received signal with a delay time τ1. The third row of FIG. 4 illustrates reception timing of a radar receiver signal with a delay time τ2. The discrete time k=Nr×(Ns/No) corresponds to a time point immediately before the end of the transmission period Tw of each transmission cycle Tr. Hereinafter, a digital received signal x(k, M) corresponding to the outputs of the A/D converters 16 and 17 will be designated as a discrete sample value x(k, M).

The correlation calculator 18 periodically generates, on the basis of a reception reference clock signal obtained by multiplying the reference signal generated by the reference signal generator Lo by prescribed times, a transmission code $C_n$ with a code length L at every discrete time k. Here, n represents an integer of 1 to L, and L represents a code length of the code sequence $C_n$.

The correlation calculator 18 calculates a sliding correlation value AC(k, M) between the discrete sample values Ir(k, M) and Qr(k, M) corresponding to the outputs of the A/D converters 16 and 17, namely, the discrete sample value x(k, M) corresponding to the received signal, and the transmission code $C_n$. AC(k, M) represents a sliding correlation value at a discrete time k in the Mth transmission cycle.

Specifically, the correlation calculator 18 calculates the sliding correlation value AC(k, M) in each transmission cycle Tr illustrated in the second row of FIG. 4, namely, at each discrete time k=1 to Ns(Nr+Nu)/No, in accordance with expression (4). The correlation calculator 18 outputs the sliding correlation value AC(k, M) of each discrete time k calculated in accordance with expression (4) to the coherent adder 19. In expression (4), * (asterisk) represents a complex conjugate operator.

[Expression 4]

$$AC(k, M) = \sum_{n=1}^{L} x(k + Ns(n-1), M)C_n^*  \quad (4)$$

In the second row of FIG. 4, a range of a measurement period of the radar receiver Rx employed when the radar received signal is received after a delay time τ1 has elapsed from the start of transmitting the radar transmitting signal is illustrated. In the third row of FIG. 4, a range of a measurement period of the radar receiver Rx employed when the radar received signal is received after a delay time τ2 has elapsed from the start of transmitting the radar transmitting signal is illustrated. The delay times τ1 and τ2 are respectively represented by the following expressions (5) and (6):

[Expression 5]

$$\tau_1 = Tp \times (L+1) \quad (5)$$

[Expression 6]

$$\tau_2 = Tp \times \left\{ \frac{(Nr + Nu)}{No} - L \right\} \quad (6)$$

Incidentally, the correlation calculator 18 may limit a measurement range, namely, the range of the discrete time k corresponding to the calculation range for the sliding correlation value AC(k, m), in accordance with the existence range of a target to be measured by the radar apparatus 1. Thus, the radar apparatus 1 can reduce the complexity of the correlation calculator 18, and hence, the complexity of the signal processor 12 can be reduced to reduce the power consumption of the radar receiver Rx.

Incidentally, when the correlation calculator 18 calculates the sliding correlation value AC(k, m) in a range of the discrete time k from Ns(L+1) to Ns(Nr+Nu)/No−NsL, the radar apparatus 1 may exclude the transmission period Tw of the transmission cycle Tr of the radar transmitting signal from the measurement period.

In this case, even though the radar transmitting signal directly sneaks into the radar receiver Rx, the radar apparatus 1 can eliminate the influence of the sneak in the measurement. Besides, when the measurement range (the range of the discrete time k) is limited, the coherent adder 19, the DFT processor 20, the peak frequency selector 21, the adjacent time-frequency component extractor 22, the correlation matrix generating adder 23 and the distance-direction angle detector 24 are also operated in the similarly limited measurement range, and hence, the throughput of these components can be reduced, so as to further reduce the power consumption in the radar receiver Rx.

The coherent adder 19 corresponding to a first coherent adder performs coherent addition (in-phase addition) of the sliding correlation values AC(k, M) over a period (Np×Tr) of a prescribed number (Np) of transmission cycles Tr on the basis of the sliding correlation value AC(k, M) calculated by the correlation calculator 18 at every discrete time k of the Mth transmission cycle Tr.

Specifically, the coherent adder 19 adds up the sliding correlation value AC(k, M) at each discrete time k over the period (Np×Tr) of the prescribed number (Np) of the transmission cycles Tr, so as to calculate a coherent additional value Cl(k, m) at every discrete time k in the mth Np times of transmission cycles Tr in accordance with expression (7).

Here, Np represents a prescribed value corresponding to the number of additions performed in the coherent adder 19. Also, m represents the ordinal number of the coherent addition output every Np times of coherent additions in the coherent adder 19 of each antenna system processor. For example, when m=1, it is the first coherent addition output from the coherent adder 19. The coherent adder 19 outputs the coherent additional value Cl(k, m) to the DFT processor 20.

[Expression 7]

$$Cl(k, m) = \sum_{g=1}^{Np} AC(k, Np(m-1) + g) \quad (7)$$

By adding the sliding correlation values AC(k, M) by Np times, the coherent adder 19 can suppress a noise component in the reflected wave signal in the range of discrete time k where the reflected wave signals from the target have high correlation, so as to improve the reception quality (SNR) of the reflected wave signal. Furthermore, since the coherent adder 9 can thus improve the reception quality of the reflected wave signal, the accuracy in estimating the arrival direction of the reflected wave signal having been reflected on a target can be improved.

Incidentally, in order to obtain an ideal additional gain, it is necessary that phase components of the sliding correlation values AC(k, M) are involved in the same range to some extent in an addition period of adding the sliding correlation values AC(k, M) by the number Np of addition times. In other words, when a target is moving, phase variation due to the movement is caused, and therefore, the number Np of addition times is preferably set on the basis of the assumed maximum moving speed of the target.

As the assumed maximum moving speed of the target is higher, the variation of a Doppler frequency included in the reflected wave signal having been reflected on the target is larger, and hence, the interval between discrete times having high correlation values is shorter. Therefore, the number Np of addition times becomes smaller, and hence the effect to improve the coherent additional gain of the coherent adder 19 is reduced.

Incidentally, in the respective embodiments described herein including the present embodiment, the effect to reduce the number of addition times employed in the DFT processor 20 can be attained by providing the coherent adder 19 before the DFT processor 20, but a configuration excluding the coherent adder 19 may be employed. Incidentally, in the respective embodiments described here including the present embodiment, the operation will be described by assuming the configuration including the coherent adder 19 but the coherent adder 19 is not always indispensable but the effects of the radar apparatus 1 of the present embodiment can be attained even though the coherent adder 19 is not provided. Incidentally, the operation performed when the coherent adder 19 is not provided is not different from that described below by assuming that the number Np of the coherent addition times is 1, and the same effects can be thus attained.

The DFT (Discrete Fourier Transform) processor 20 corresponding to a second coherent adder uses, as a correction coefficient, phase variation θ($f_s$) (see expression (8)) in accordance with 2Nf+1 different Doppler frequency components $f_s$, so as to perform coherent addition by using, as a unit, coherent addition results Cl(k, Nc(w−1)+1) to Cl(k, Nc×w), that is, Nc outputs of the coherent adder 19 obtained at every discrete time k (see expression (9)). The DFT processor 20 outputs the result of the coherent addition by the number Nc of the coherent addition times to the peak frequency selector 21 and the adjacent time-frequency component extractor 22.

[Expression 8]

$$\theta(f_s) = 2\pi f_s(Tr \times Np) \qquad (8)$$

[Expression 9]

$$FT\_CI^{Nant}(k, f_s, w) = \sum_{q=1}^{Nc} CI(k, Nc(w-1)+q)\exp[-j2\pi f_s TrNp(q-1)] \qquad (9)$$

Here, w represents an integer of 1 or more, and corresponds to the number of repeating times in every (Np×Nc) times of the transmission cycles Tr. For example, when w=1, it means transmission cycles Tr in a total number of Np×Nc from the first transmission cycle Tr to the (Np×Nc)th transmission cycle Tr. In other words, the DFT processor 20 outputs, every time the transmission cycle Tr is repeated by (Np×Nc) times, the coherent addition result of expression (9) to the peak frequency selector 21 and the adjacent time-frequency component extractor 22.

In expression (9), Nant represents the ordinal number (number) of the antenna system processor, namely, any of 1 to Na (a constant value), and for example, in the radar receiver Rx of FIG. 2, Na=4. Besides, in expression (9), the exponential function part (exp component) indicates a cancellation amount of the phase variation in accordance with the 2Nf+1 different Doppler frequency components $f_s$ for cancelling phase variation $\theta(f_s)$ included in the reflected wave signal due to the movement of the target. Besides, q represents a natural number of 1 to Nc, and corresponds to the range of the number of the coherent addition times of the DFT processor 20.

Furthermore, $FT\_CI^{Nant}(k, f_s, w)$ represents the wth output of the DFT processor 20, and corresponds to the coherent addition result in accordance with a Doppler frequency component $f_s$ at a discrete time k of the Nant-th antenna system processor. Besides, k represents 1 to ((Nr+Nu)×Ns/No); $f_s$ represents $-Nf \times \alpha_f \ldots 0, \ldots,$ or $Nf \times \alpha_f$; $\alpha_f$ represents a Doppler frequency interval and is a constant; and j represents an imaginary unit.

In this manner, each of the antenna system processors D1 to D4 can obtain, through the calculation in accordance with expression (9), the coherent addition results, $FT\_CI^{Nant}(k, -Nf, w)$ to $FT\_CI^{Nant}(k, Nf, w)$ in accordance with the 2Nf+1 Doppler frequency components $f_s$ at every discrete time k in each period (Tr×Np×Nc) corresponding to the (Np×Nc) times of the transmission cycles Tr.

Incidentally, the DFT processor 20 may perform the coherent addition in accordance with the 2Nf+1 Doppler frequency components $F_s$ at every discrete time k by detecting a Doppler frequency component by using a window function window(g) having a window function length Nc identical to the number of the coherent addition times (see expression (10)). Thus, the radar apparatus 1 can reduce side lobe in the coherent addition results in accordance with the Doppler frequency components $F_s$. Here, g represents an integer of 1 to Nc. The window function window(g) uses, for example, a hamming window or a hanning window.

[Expression 10]

$$FT\_CI^{Nant}(k, f_s, w) = \sum_{q=1}^{Nc} \text{window}(g) CI(k, Nc(w-1)+q)\exp[-j2\pi f_s TrNp(q-1)] \qquad (10)$$

The outputs of the DFT processor of each of the respective antenna system processors D1 to D4, that is, $FT\_CI^1(k, f_s, w)$ to $FT\_CI^{Nant}(k, f_s, w)$, are input to the peak frequency number selector 21 and the adjacent time-frequency component extractor 22 as a correlation vector $h(k, f_s, w)$ (see expression (11)).

[Expression 11]

$$h(k, f_s, w) = \begin{bmatrix} FT\_CI^1(k, f_s, w) \\ FT\_CI^2(k, f_s, w) \\ \vdots \\ FT\_CI^{Na}(k, f_s, w) \end{bmatrix} \qquad (11)$$

The peak frequency selector 21 corresponding to an example of a correlation vector extractor calculates, in the wth (Np×Nc) times of the transmission cycles Tr, a sum of squares of respective components of the correlation vector $h(k, f_s, w)$ obtained as a result of the coherent addition in accordance with the 2Nf+1 Doppler frequency components $f_s$ supplied from each of the antenna system processors D1 to D4.

The peak frequency selector 21 extracts correlation vectors $h(k, f_s, w)$ having components whose sum of squares $\|h(k, f_s, w)\|^2$ exceeds a prescribed value Lev_h (see FIG. 5A), and among the extracted correlation vectors $(k, f_s, w)$, it selects a correlation vector $h(k, f_{peak(k)}, w)$ having a Doppler frequency component $f_{peak(k)}$ giving a maximum value (peak value).

The abscissa of FIG. 5A indicates the Doppler frequency component $f_s$, and the ordinate of FIG. 5B indicates the sum of squares $\|h(k, f_s, w)\|^2$ of respective components of the correlation vector. The peak frequency selector 21 outputs, to the adjacent time-frequency component extractor 22 and the correlation matrix generating adder 23, the Doppler frequency component $f_{peak(k)}$ giving the maximum value (peak value) at every discrete time k and the correlation vector $h(k, f_{peak(k)}, w)$ having the Doppler frequency component $f_{peak(k)}$.

Incidentally, when there are a plurality of Doppler frequency components $f_{peak(k)}$ giving the maximum value (peak value), the peak frequency selector 21 outputs, to the adjacent time-frequency component extractor 22 and the correlation matrix generating adder 23, the plural Doppler frequency components $f_{peak(k)}$ and the correlation vectors $h(k, f_{peak(k)}, w)$ having the Doppler frequency components $f_{peak(k)}$.

Although the description is herein made on the assumption that the peak frequency selector 21 extracts the correlation vectors $h(k, f_s, w)$ having components whose sum of squares $\|h(k, f_s, w)\|^2$ exceeds the prescribed value Lev_h, the selection of the Doppler frequency component $f_s$ corresponding to a peak value is not limited to this, but a Doppler frequency component $f_s$ corresponding to a peak value may be selected, for example, on the basis of an amplitude value or a square value of a specific component of the correlation vector $h(k, f_s, w)$.

The adjacent time-frequency component extractor 22 corresponding to an example of the correlation vector extractor extracts $\{(2NE+1) \times (2NT+1)-1\}$ correlation vectors around the correlation vector (k, $f_{peak(k)}$, w) in two-dimensional coordinates having coordinate axes of the Doppler frequency component $f_s$ and the discrete time k with the correlation vector (k, $f_{peak(k)}$, w) having the Doppler frequency component $f_{peak(k)}$ at every discrete time k selected by the peak frequency selector 21 set as the center (see a white circle of FIG. 5(B)), and outputs the extracted correlation vectors to the correlation matrix generating adder 23 (see black circles of FIG. 5B).

Specifically, the adjacent time-frequency component extractor 22 extracts the $\{(2NE+1) \times (2NT+1)-1\}$ correlation vectors defined by 2NE Doppler frequency components $f_{peak(k)} - NE \times \alpha_f, \ldots,$ and $f_{peak(k)} - \alpha_f$ and $f_{peak(k)} + \alpha_f \ldots,$ and $f_{peak(k)} + NE \times \alpha_f$ adjacent on both sides of the Doppler frequency component $f_{peak(k)}$ at every discrete time k selected by the peak frequency selector 21, and 2NT discrete times k−NT, . . . , and k−1, and k+1, . . . , and k+NT adjacent on both sides of the discrete time k.

For example, if NE=NT=1, the adjacent time-frequency component extractor 22 extracts eight correlation vectors around the Doppler frequency component $f_{peak(k)}$. The abscissa of FIG. 5B indicates the discrete time k, and the ordinate of FIG. 5B indicates the Doppler frequency component $f_s$. Besides, NE represents the number of components (correlation vectors) to be extracted on the axis of the Doppler frequency component $f_s$ of FIG. 5B. NT represents the number of components (correlation vectors) to be extracted on the axis of the discrete time k of FIG. 5B.

It is noted that NE and NT are not always the same value but may be different values. For example, the adjacent time-frequency component extractor 22 may make larger, than the other, either the number NE or NT of components to be extracted which has a larger signal spread of the sum of squares $\|h(k, f_{peak(k)}, w)\|^2$ of the peak value (maximum value) of the correlation vector at every discrete time k or every Doppler frequency component $f_s$. Thus, the radar apparatus 1 can extract a larger number of correlation vectors in a range having a sufficiently large signal spread of the sum of squares of the correlation vectors, and therefore, the rank of added correlation matrixes to be used in the correlation matrix generating adder 23, namely, the number of correlation vectors necessary for sufficiently generating an added correlation matrix, can be sufficiently secured.

The correlation matrix generating adder 23 generates, on the basis of the correlation vectors in a total number of $(2NE+1) \times (2NT+1)$, including one correlation vector h (k, $f_s$, w) selected by the peak frequency selector 21 and $(2NE+1)(2NT+1)-1$ correlation vectors extracted by the adjacent time-frequency component extractor 22, correlation matrixes corresponding to correlation of reflected wave signals (received signals) received by the respective receiver antennas. The correlation matrix generating adder 23 adds up the generated correlation matrixes so as to calculate an added correlation matrix $R_{sum}(k, f_{peak(k)}, w)$ in accordance with expression (12), and outputs the calculated matrix to the distance-direction angle detector 24. In expression (12), a superscript H represents complex conjugate transpose.

[Expression 12]

$$R_{sum}(k, f_{peak(k)}, w) = \frac{1}{(2NT+1)(2NE+1)} \quad (12)$$

-continued
$$\sum_{u=-NT}^{NT} \sum_{v=-NF}^{NF} h(k+u, f_{peak(k)} + \alpha_f v, w) h(k+u, f_{peak(k)} + \alpha_f v, w)^H$$

Incidentally, the correlation matrix generating adder 23 may calculate the added correlation matrix $R_{sum}(k, f_{peak(k)}, w)$ in accordance with expression (14) by multiplying the generated correlation matrix by a weighting factor $wc_{uv}$ represented by expression (13). Here, u represents an integer of −NT to NT, and v represents an integer of −NE to NE. In this manner, as the values u and v are larger, a smaller weighting factor is used, and hence, the radar apparatus 1 can reduce the influence of a noise signal even though correlation vectors around the peak value include signals at low signal levels.

[Expression 13]

$$\sum_{u=-NT}^{NT} \sum_{v=-NF}^{NF} wc_{uv} = 1 \quad (13)$$

[Expression 14]

$$R_{sum}(k, f_{peak(k)}, w) = \quad (14)$$
$$\frac{1}{(2NT+1)(2NE+1)} \sum_{u=-NT}^{NT} \sum_{v=-NF}^{NF} wc_{uv} h(k+u, f_{peak(k)} + \alpha_j v, w)$$
$$h(k+u, f_{peak(k)} + \alpha_j v, w)^H$$

The distance-direction angle detector 24 performs direction detection at every discrete time k by using the added correlation matrix $R_{sum}(k, f_{peak(k)}, w)$ corresponding to the output of the correlation matrix generating adder 23, so as to detect the distance and the direction to the target. As the direction detection, it outputs a calculation result of a direction estimation evaluation function $P_{DOA}(k, f_{peak(k)}, w, \theta_q)$ obtained in accordance with a prescribed arrival direction estimating algorithm (such as the MUSIC method or the Capon method) using a precedently stored direction vector $a(\theta_q)$ and the added correlation matrix $R_{sum}(k, f_{peak(k)}, w)$.

Here, the direction vector $a(\theta_q)$ is a Na-dimensional column vector corresponding to a complex response of each receiver antenna when the reflected wave signal having been reflected on the target arrives from a direction of an azimuth $\theta_q$. The direction vector $a(\theta_q)$ corresponding to a complex response of each receiver antenna arrived at every azimuth $\theta_q$ is precedently measured, for example, in an anechoic chamber, and includes not only phase difference information geometrically calculated in accordance with a distance between the respective receiver antennas but also various deviation information such as a coupling and amplitude error, and a phase error between antenna elements of the respective receiver antennas, which also applies to the embodiments described below.

In the case where, for example, elements of the receiver antennas included in the array antenna are linearly arranged at equal element interval d (see FIG. 6), an ideal direction vector $a(\theta_q)$ free from a phase deviation and an amplitude deviation between the receiver antennas is represented by expression (15).

[Expression 15]

$$a(\theta_q) = \begin{bmatrix} 1 \\ \exp\{-j2\pi d\sin\theta_q/\lambda\} \\ \vdots \\ \exp\{-j2\pi(Na-1)d\sin\theta_q/\lambda\} \end{bmatrix} \quad (15)$$

The azimuth $\theta_q$ is a variable varied at a prescribed interval $\Delta\theta$ in an arrival direction estimation range $[\theta_{min}, \theta_{max}]$ of the reflected wave signal in the radar apparatus 1, and is represented, for example, in accordance with expression (16). Here, q represents an integer from 0 to NU. NU is represented by expression (17). In expression (17), floor[y] represents a function for outputting the maximum integer not exceeding a real number y.

[Expression 16]

$$\theta_q = \theta_{min} + u\Delta\theta \quad (16)$$

[Expression 17]

$$NU = \text{floor}[(\theta_{max} - \theta_{min})/\Delta\theta] + 1 \quad (17)$$

The distance-direction angle detector 24 estimates the distance or the azimuth from the radar apparatus 1 to the target at every discrete time k on the basis of the added correlation matrix $R_{sum}(k, f_{peak(k)}, w)$ calculated by the correlation matrix generating adder 23, and detects the presence of the target depending upon the estimation result.

Specifically, the distance-direction angle detector 24 calculates, on the basis of the direction vector $a(\theta_q)$ and the added correlation matrix $R_{sum}(k, f_{peak(k)}, w)$, the direction estimation evaluation function $P_{DOA}(k, f_{peak(k)}, w, \theta_q)$ by the prescribed arrival direction estimation algorithm (such as the Fourier method, the MUSIC method or the Capon method) in accordance with expression (18).

The distance-direction angle detector 24 detects, in the range of $[\theta_{min}, \theta_{max}]$ of the azimuth $\theta_q$, a maximum value (peak value) of the direction estimation evaluation function $P_{DOA}(k, f_{peak(k)}, W, \theta_q)$ at every discrete time k. When the maximum value at every discrete time k is equal to or larger than a prescribed threshold value, the distance-direction angle detector 24 estimates that the azimuth $\theta_q$ giving the maximum value at every discrete time k is the arrival direction of the reflected wave signal having been reflected on the target.

[Expression 18]

$$P_{DOA}(k, f_{peak(k)}, w, \theta_q) = \frac{1}{\{a(\theta_q)^H R_{sum}^{-1}(k, f_{peak(k)}, w)a(\theta_q)\}} \quad (18)$$

Besides, the distance-direction angle detector 24 estimates, on the basis of the discrete time k giving the maximum value of the direction estimation evaluation function $P_{DOA}(k, f_{peak(k)}, w, \theta_q)$, a distance $D(k)$ from a measurement point of the radar apparatus 1 to the target in accordance with expression (19). Here, $C_0$ represents light speed.

[Expression 19]

$$D(k) = \frac{C_0 Tp(k-1)}{2Ns} \quad (19)$$

Incidentally, when there are reflected wave signals having been reflected on a plurality of targets at the same discrete time k and the same Doppler frequency component $f_s$, there is a tendency that the correlation among the reflected wave signals is high. Therefore, the distance-direction angle detector 24 may apply space smoothing to the added correlation matrix $R_{sum}(k, f_{peak(k)}, w)$, so that the correlation among the respective reflected wave signals can be suppressed and accuracy in separating a plurality of reflected wave signals can be improved.

Besides, in the case where the radar receiver Rx uses the array antenna including the respective receiver antennas linearly arranged at equal intervals, owing to the phase conjugate symmetry of the array antenna, the distance-direction angle detector 24 may subject the added correlation matrix $R_{sum}(k, f_{peak(k)}, w)$ to unitary transformation described in Non-patent Reference Document 1 described below, so that the correlation among the respective reflected wave signals can be suppressed and accuracy in separating a plurality of reflected wave signals can be improved.

(Non-patent Reference Document 1) K. C. Huarng and C. C. Yeh, "A unitary transformation method for angle of arrival estimation", IEEE Trans. Acoust., Speech, Signal Process., vol. 39, no. 4, pp. 975-977, April 1991.

Figure 7:
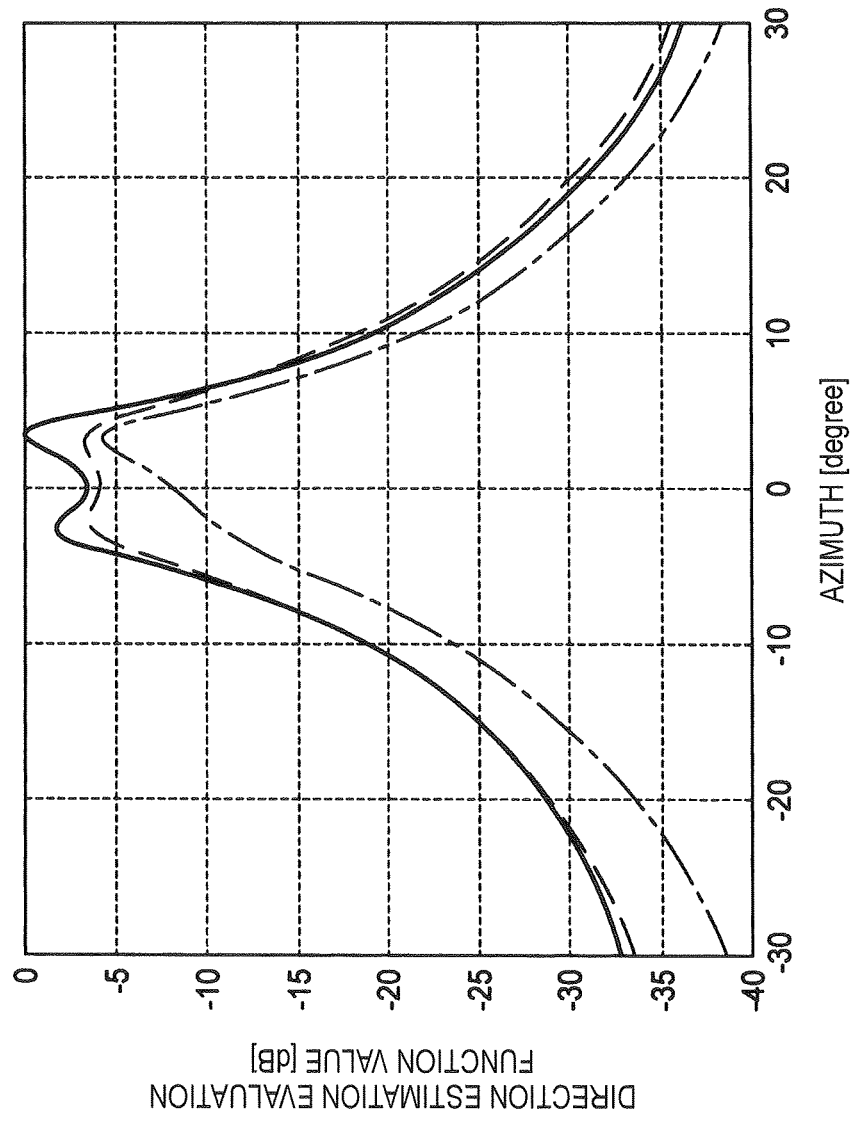
FIG. 7 is a graph illustrating a result of azimuth detection simulation for a reflected wave signal in the radar apparatus of Embodiment 1.

FIG. 7 is a graph illustrating simulation results of azimuth detection of reflected wave signals in the radar apparatus 1 of Embodiment 1. The abscissa of FIG. 7 indicates the azimuth (angle) [degrees] and the ordinate of FIG. 7 indicates a direction estimation evaluation function value [dB].

A solid line shown in FIG. 7 indicates a direction estimation evaluation function value in a range of the azimuth ±30 degrees generated by the radar apparatus 1 of the present embodiment by using a Doppler frequency component $f_s$ and a two-dimensional added correlation matrix at a discrete time k. As the simulation conditions, for example, the number Na of the antenna system processors is 4, the receiver antenna elements are linearly arranged at equal intervals of 0.5 wavelength in the array antenna, and in obtaining the added correlation matrix $R_{sum}(k, f_{peak(k)}, w)$, it is assumed that Ns=2, Nc=64, Np=128, Nf=64, L=8, Tr=0.35 [μs], and NE=NT=1.

On the other hand, a long chain line of FIG. 7 indicates a direction estimation evaluation function value calculated by a conventional radar apparatus based on an added correlation matrix $R_{sum}(k, f_{peak(k)}, w)$ generated by using a correlation matrix along the discrete time direction alone (namely, NE=0 and NT=4).

Besides, an alternate long and short dash line of FIG. 7 indicates a direction estimation evaluation function value calculated by a conventional radar apparatus based on a correlation matrix along the Doppler frequency component direction alone (namely, NE=4 and NT=0).

Besides, it is assumed that two targets are disposed at the same distance at azimuths −3° and 3° from the radar apparatus 1. As the arrival direction estimation algorithm employed in the distance-direction angle detector 24, U-Capon method described in the following Non-patent Reference Document 2 is used for calculating the direction estimation evaluation function value.

(Non-patent Reference Document 2) N. KIKUMA, K. MOURI, H. HIRAYAMA, K. SAKAKIBARA, "Performance Analysis of Unitary Capon Method for DOA Estimation with High Computational Efficiency", WE3-5, pp. 313-316, Proceedings of ISAP 2005, Seul, Korea.

Figures 9A, 9B:
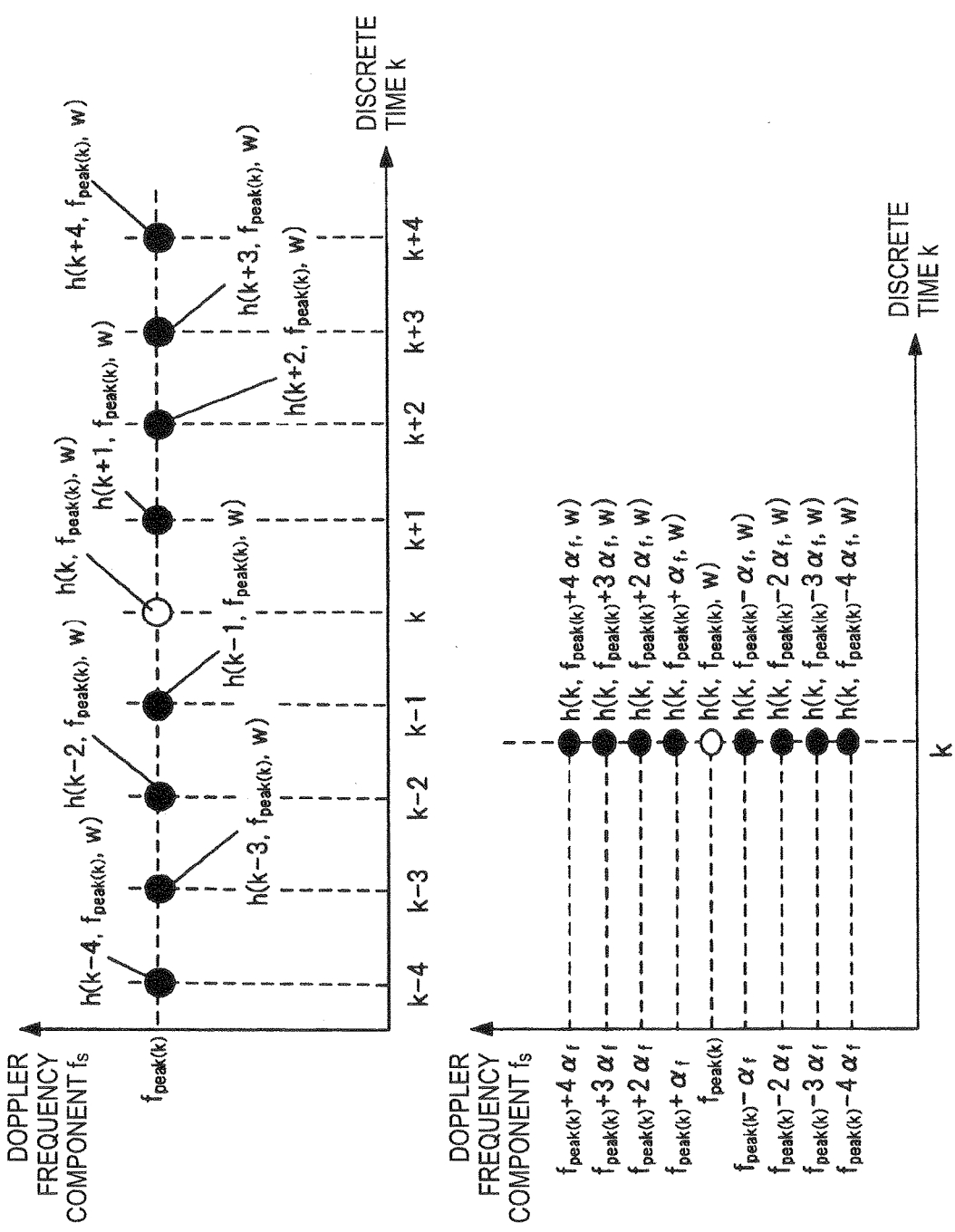
FIG. 9A is a diagram explaining an operation performed by the adjacent time-frequency component extractor for extracting a correlation vector at every peripheral discrete time.
FIG. 9B is a diagram explaining an operation performed by the adjacent time-frequency component extractor for extracting a correlation vector at every Doppler frequency.

In FIG. 7, the radar apparatus 1 of the present embodiment can clearly separate the two targets and can attain high resolution and a high peak level as compared with those attained by the direction estimation evaluation function value of one-dimensional direction of the Doppler frequency component $f_s$ (see the long chain line of FIG. 7 and FIG. 9A) and the direction estimation evaluation function value of one-dimensional direction of the discrete time k (see the alternate long and short dash line of FIG. 7 and FIG. 9B).

Figure 8:
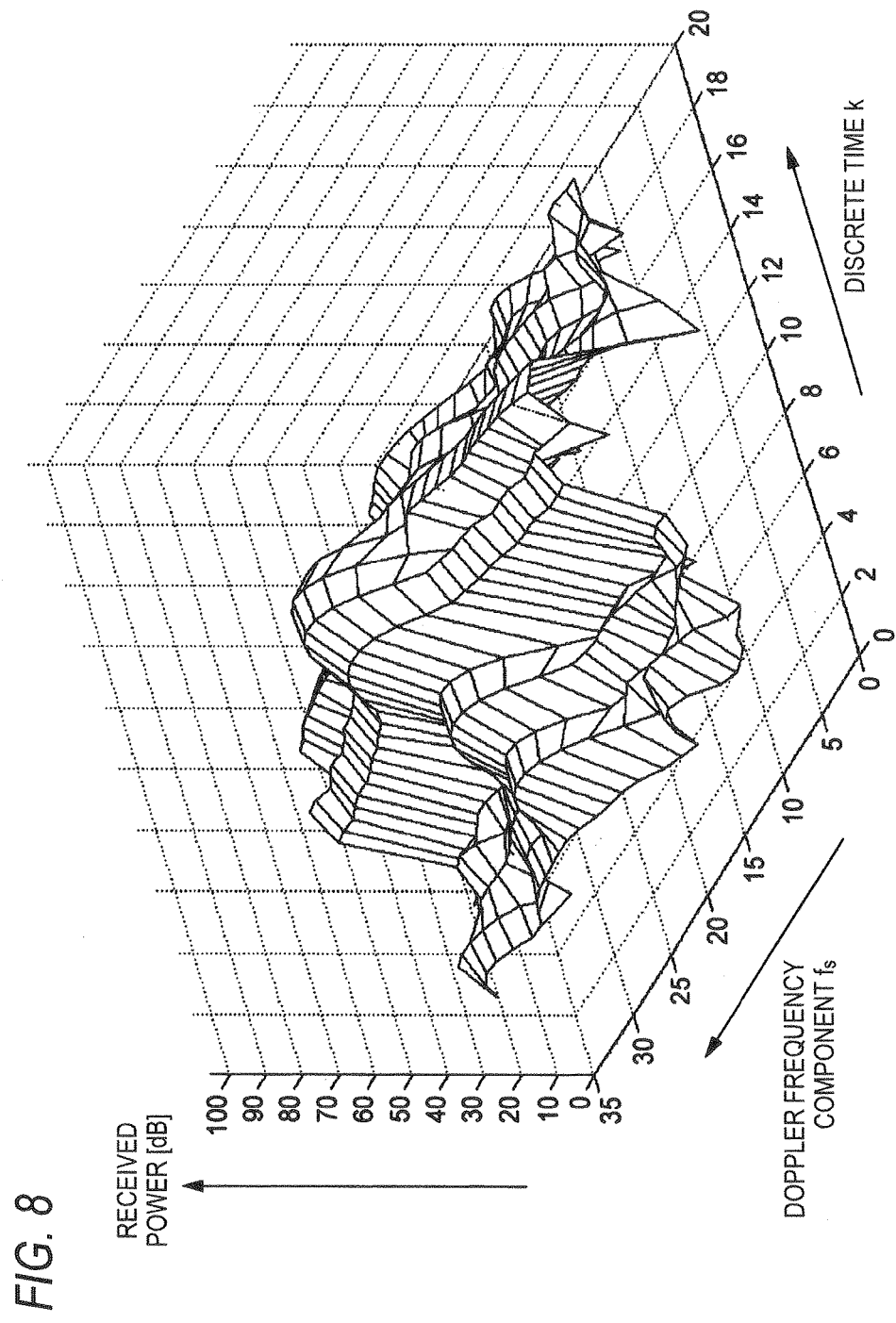
FIG. 8 is a graph illustrating a received power profile obtained at every Doppler frequency component $f_s$ or every discrete time k in the radar apparatus of Embodiment 1.

FIG. 8 is a graph illustrating a received power profile obtained at every Doppler frequency component $f_s$ or every discrete time k in the radar apparatus 1 of Embodiment 1. The abscissas of FIG. 8 indicate the discrete time k and the Doppler frequency component $f_s$, and the ordinate of FIG. 8 indicates the received power.

In FIG. 8, a signal of a received power waveform is spread along the two axes along the direction of the Doppler frequency component $f_s$ and the direction of the discrete time k, and a maximum value (peak value) appears. The signal spread of the received power waveform in the direction of the discrete time k depends upon the sampling rate of the A/D converters 16 and 17, and is increased relatively as the number Ns of discrete samples per pulse time Tp (=Tw/L) in the radar transmitting signal, namely, the over sample number per pulse, is larger. In FIG. 8, Ns=2.

In FIG. 8, at discrete times $k_{peak}-1$ and $k_{peak}+1$ adjacent on both sides of a discrete time $k_{peak}$ corresponding to the maximum value (peak value) of the received power waveform, sufficient received power can be obtained, but the received power is abruptly lowered, for example, at a discrete time $k_{peak}-2$ adjust to the discrete time $k_{peak}-1$ and at a discrete time $k_{peak}+2$ adjust to the discrete time $k_{peak}+1$.

At this point, when the over sample number Ns per pulse of the radar transmitting signal is increased for increasing the signal spread of the received power waveform in the direction of the discrete time k, it is necessary to increase the sampling rate of the A/D converters 16 and 17, and hence, the number of discrete times k within a detection distance range of the radar apparatus 1 is so increased that the circuit scale of the radar apparatus 1 is increased.

On the other hand, the signal spread of the received power waveform in the direction of the Doppler frequency component $f_s$ depends on an interval $\alpha_f$ of the Doppler frequency component $f_s$. The signal spread of the received power waveform in the direction of the Doppler frequency component $f_s$ is relatively increased by reducing the interval $\alpha_f$ of the Doppler frequency component $f_s$.

In FIG. 8, at Doppler frequency components $f_{peak(k)}-\alpha_f$ and $f_{peak(k)}+\alpha_f$ adjacent on both sides of a Doppler frequency component $f_{peak(k)}$ corresponding to the maximum value (peak value) of the received power waveform, sufficient received power can be obtained, but the received power is abruptly lowered, for example, at a Doppler frequency component $f_{peak(k)}-2\alpha_f$ adjust to the Doppler frequency component $f_{peak(k)}-\alpha_f$ and at a Doppler frequency component $f_{peak(k)}+2\alpha_f$ adjust to the Doppler frequency component $f_{peak(k)}\alpha_f$. It is noted that $\alpha_f=1$ in FIG. 8.

At this point, when the interval $\alpha_f$ of the Doppler frequency component $f_s$ is reduced for increasing the signal spread of the received power waveform in the direction of the Doppler frequency component $f_s$, the total number 2Nf+1 of the Doppler frequency components $f_s$ is increased in the range of detection Doppler frequency components $f_s$ in the radar apparatus 1, and hence, the circuit scale of the radar apparatus 1 is increased.

In the radar apparatus 1 of the present embodiment, the adjacent time-frequency component extractor 22 extracts, in the two-dimensional coordinates of the Doppler frequency component fs and the discrete time k, (2NE+1)×(2NT+1) correlation vectors included in the peripheral of the correlation vector h(k, $f_{peak(k)}$, w) selected by the peak frequency selector 21.

FIG. 9A is an explanatory diagram of an operation of the adjacent time-frequency component extractor for extracting a correlation vector at every peripheral discrete time. FIG. 9B is an explanatory diagram of an operation of the adjacent time-frequency component extractor for extracting a correlation vector at every Doppler frequency. The abscissas of FIG. 9A and FIG. 9B indicate the discrete time k, and the ordinates of FIG. 9A and FIG. 9B indicate the Doppler frequency component $f_s$.

For example, in the case where the conventional radar apparatus calculates the added correlation matrix $H_{sum}(k, f_{peak(k)}, w)$ by using nine correlation vectors (k, $f_s$, w), if signal spread of a received power waveform in one-dimensional coordinates along the direction of the discrete time k is used, it is necessary to add up adjacent correlation vectors up to the fourth vector on each side (see FIG. 9A).

Accordingly, when the conventional radar apparatus uses the signal spread of a sufficiently high received power waveform in the one-dimensional coordinates along the direction of the discrete time k, the over sample number Ns per pulse of about 4 is necessary for calculating the added correlation matrix by using the correlation vectors. For this purpose, a rapid A/D converter is necessary, and hence the number of discrete times k within the detection distance range of the conventional radar apparatus is increased, which greatly increases the circuit scale of the conventional radar apparatus.

On the other hand, in the radar apparatus 1 of the present embodiment, the addition of correlation vectors in the direction of the discrete time k is performed up to merely one adjacent vector on each side, and hence, when the over sample number Ns per pulse of the radar apparatus 1 is 2, it is sufficient.

Besides, for example, in the case where the conventional radar apparatus calculates the added correlation matrix $H_{sum}$ (k, $f_{peak(k)}$, w) by using nine correlation vectors (k, $f_s$, w), if signal spread of a received power waveform in one-dimensional coordinates along the direction of the Doppler frequency component $f_s$ is used, it is necessary to add up adjacent correlation vectors up to the fourth vector on each side (see FIG. 9B).

Accordingly, when the conventional radar apparatus uses the signal spread of a sufficiently high received power waveform in the one-dimensional coordinates along the direction of the Doppler frequency component $f_s$, for calculating the added correlation matrix by using the correlation vectors, it is necessary to reduce the interval $\alpha_f$ of the Doppler frequency component $f_s$ to about ¼ of the interval $\alpha_f$ employed in the radar apparatus 1 of the present embodiment. Therefore, in the range of the detection Doppler frequency component $f_s$ in the conventional radar apparatus, the total number of the Doppler frequency components $f_s$ is increased by four times, which greatly increases the circuit scale of the conventional radar apparatus.

On the other hand, in the radar apparatus 1 of the present embodiment, the addition of correlation vectors of the Doppler frequency component $f_s$ is performed up to merely one adjacent vector on each side, and therefore, there is no need to reduce the interval $\alpha_f$ of the Doppler frequency components $f_s$, and hence, the circuit scale is not increased.

As described so far, the radar apparatus 1 of the present embodiment can generate an added correlation matrix by using correlation vectors, in a total number of (2NE+1)× (2NT+1) including a correlation vector (k, $f_{peak(k)}$, w)

selected by the peak frequency selector 21 and $\{(2NE+1) \times (2NT+1)-1\}$ correlation vectors adjacent on the both sides of the correlation vector (k, $f_{peak(k)}$, w) in the two-dimensional coordinates of the Doppler frequency component $f_s$ and the discrete time k.

Accordingly, the radar apparatus 1 can highly accurately estimate the distance from the radar apparatus 1 to a target or the azimuth of an arrival direction of a reflected wave signal having been reflected on the target by using reflected wave signals that are received by a plurality of receiver antennas included in the array antenna and highly correlated with each other, and have good SNR.

Besides, in the radar apparatus 1, since high coherent additional gain can be obtained in the respective antenna system processors D1 to D4, the SNR of the reflected wave signals can be improved, and furthermore, an added correlation matrix can be generated by using correlation vectors in a total number of $(2NE+1) \times (2NT+1)$. Accordingly, a sufficient rank for generating, for example, an inverse matrix of the correlation matrix can be obtained, and therefore, as compared with the conventional radar apparatus, the radar apparatus 1 can suppress increase of its circuit scale, and attain an improved target detection accuracy because a high maximum value (peak value) of a received power waveform can be obtained due to high resolution.

Embodiment 2

Next, a radar apparatus 1A according to Embodiment 2 will be described with reference to FIG. 10. FIG. 10 is a block diagram illustrating in detail the internal configuration of the radar apparatus 1A of Embodiment 2. The radar apparatus 1A includes a reference signal generator Lo, a radar transmitter Tx and a radar receiver RxA.

The radar receiver RxA includes antenna system processors D1 to D4 in number of, for example, four, a peak frequency selector 21, a adjacent time-frequency component extractor 22A, an incoming wave number estimator 25, a correlation matrix generating adder 23 and a distance-direction angle detector 24. Hereinafter, like reference numerals are used to refer to like elements and operations included and performed in the radar apparatus 1A of the present embodiment and in the radar apparatus 1 of Embodiment 1 for omitting or simplifying the description, and differences from the radar apparatus 1 will be herein described.

The radar apparatus 1A of the present embodiment estimates the number of incoming waves of reflected wave signals having been reflected on a target in the incoming wave number estimator 25, and when it is determined that the number of incoming waves is two or more, the radar apparatus 1A estimates the distance to the target or the arrival direction of the reflected wave signals by using an added correlation matrix described in Embodiment 1.

The incoming wave number estimator 25 estimates the number of incoming waves of the reflected wave signals having been reflected on the target on the basis of a correlation vector (k, $f_{peak(k)}$, w) of a Doppler frequency component $f_{peak(k)}$ at every discrete time k selected by the peak frequency selector 21. Specifically, the incoming wave number estimator 25 estimates the number of incoming waves of the reflected wave signals having been reflected on the target on the basis of phase difference variation between two components of the correlation vector (k, $f_{peak(k)}$, w) of the Doppler frequency component $f_{peak(k)}$.

For example, in the case where an element distance d between a plurality of receiver antennas included in an array antenna of the radar receiver RxA is constant and that the respective receiver antennas are linearly arranged, the incoming wave number estimator 25 calculates a phase difference $\theta_z$ between the zth component, FT_CI$^z$(k, $f_s$, w), of the correlation vector (k, $f_{peak(k)}$, w) and the (z+1)th component, FT_CI$^{(z+1)}$(k, $f_s$, w) in accordance with expression (20). Here, z represents an integer of 1 to Na−1. In expression (20), angle[yy] represents an operator outputting an angle [rad] of a complex number yy.

[Expression 20]

$$\theta_z = \sin^{-1}\left\{\frac{\lambda}{2\pi d}\text{angle}[\text{FT\_CI}^z(k, f_s, w)^H \text{FT\_CI}^{z+1}(k, f_s, w)]\right\} \quad (20)$$

The incoming wave number estimator 25 calculates deviations of the phase differences $\theta_z$ between the zth (z=1 to Na−1) receiver antenna and its adjacent receiver antennas, and when the deviation of the thus calculated Na−1 phase differences $\theta_z$ is larger than a prescribed value, it determines that a plurality of reflected wave signals arrive. The incoming wave number estimator 25 outputs the determination result of the number of incoming waves to the adjacent time-frequency component extractor 22A.

In accordance with the estimation result of the number of incoming waves obtained by the incoming wave number estimator 25, the adjacent time-frequency component extractor 22A changes the number NE of components (correlation vectors) to be extracted on the axis of the Doppler frequency component $f_s$ and the number NT of components (correlation vectors) to be extracted on the axis of the discrete time k.

The adjacent time-frequency component extractor 22A extracts, on the basis of the changed numbers NE and NT of components to be extracted, correlation vectors in number of $\{(2NE+1) \times (2NT+1)-1\}$ defined by 2NE Doppler frequency components $f_{peak(k)}$−NE×$\alpha_1$, . . . , and $f_{peak(k)}$−$\alpha_f$ and $f_{peak(k)}$+$\alpha_f$, . . . , and $f_{peak(k)}$+NE×$\alpha_f$ adjacent on both sides of the Doppler frequency component $f_{peak(k)}$ at every discrete time k selected by the peak frequency selector 21, and 2NT discrete times k−NT, . . . , and k−1, and k+1, . . . , and k+NT adjacent on both sides of the discrete time k.

When it is estimated, as a result of the estimation of the number of incoming waves by the incoming wave number estimator 25, that the number of incoming waves is, for example, one, there is no need of high separation performance for a plurality of incoming waves, the adjacent time-frequency component extractor 22A changes the extraction numbers to NE=NT=0. Thus, the number of outputs of correlation vectors from the adjacent time-frequency component extractor 22A is zero, and hence, the radar apparatus 1A can reduce the complexity for generating correlation matrixes in the correlation matrix generating adder 23.

Alternatively, when it is estimated, as a result of the estimation of the number of incoming waves by the incoming wave number estimator 25, that the number of incoming waves is, for example, plural, there is need of high separation performance for a plurality of incoming waves, and hence, the adjacent time-frequency component extractor 22A changes the extraction numbers NE and NT to large values. Thus, the number of outputs of correlation vectors from the adjacent time-frequency component extractor 22A is increased, the rank of added correlation matrixes can be easily secured to be approximately larger than the number of incoming waves in the correlation matrix generating adder 23, and hence, the radar apparatus 1A can improve the separation performance for a plurality of incoming waves (reflected wave signals).

As described so far, the radar apparatus 1A of the present disclosure can vary the numbers NE and NT of correlation vectors to be extracted in the adjacent time-frequency component extractor 22A on the basis of the estimation result of the number of incoming waves obtained by the incoming wave number estimator 25, and therefore, the complexity for added correlation matrixes in the correlation matrix generating adder 23 can be reduced, and the separation performance for a plurality of incoming waves (reflected wave signals) can be improved.

Embodiment 3

Figure 11:
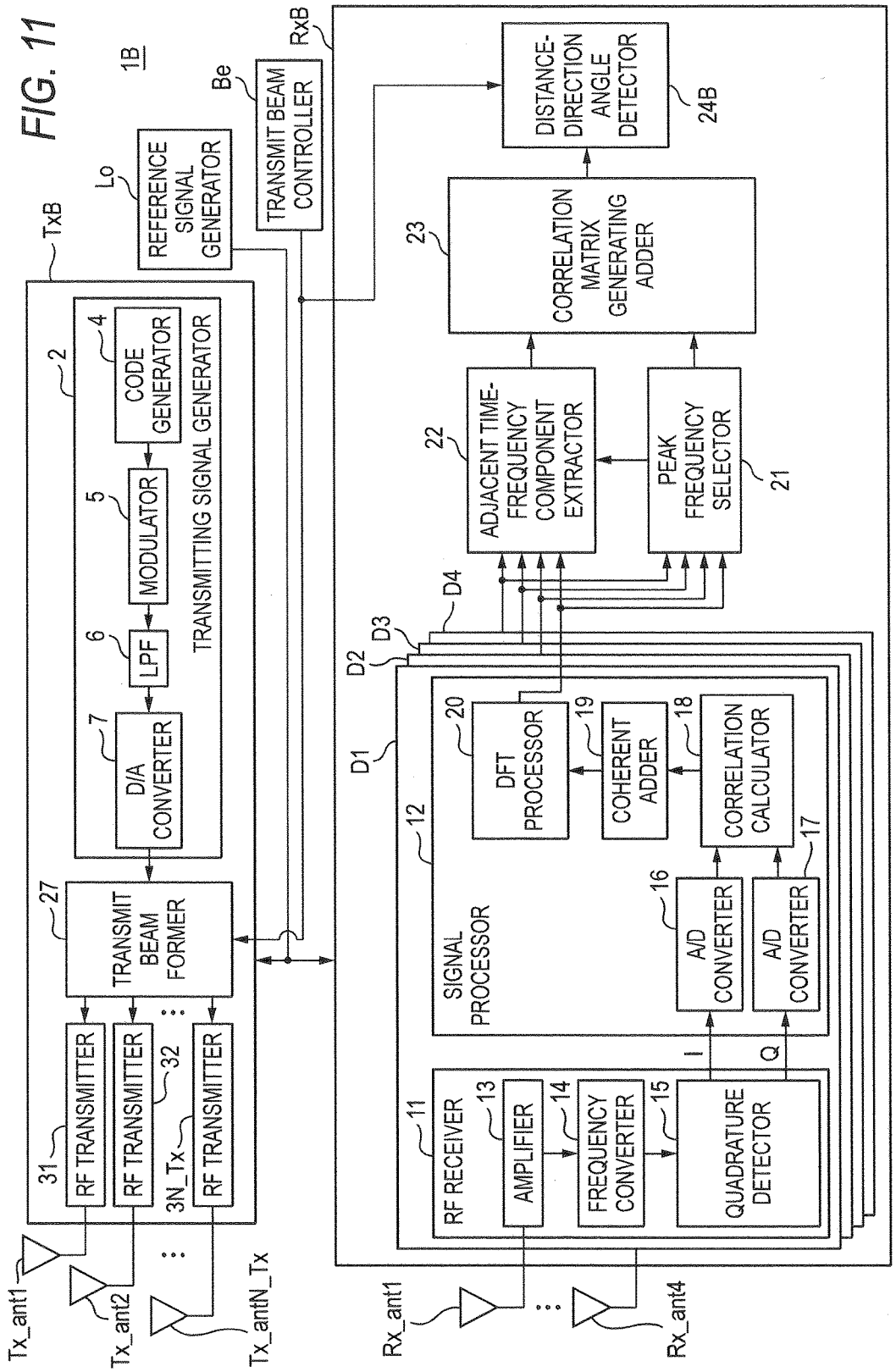
FIG. 11 is a block diagram illustrating in detail the internal configuration of a radar apparatus according to Embodiment 3.
Figure 12:
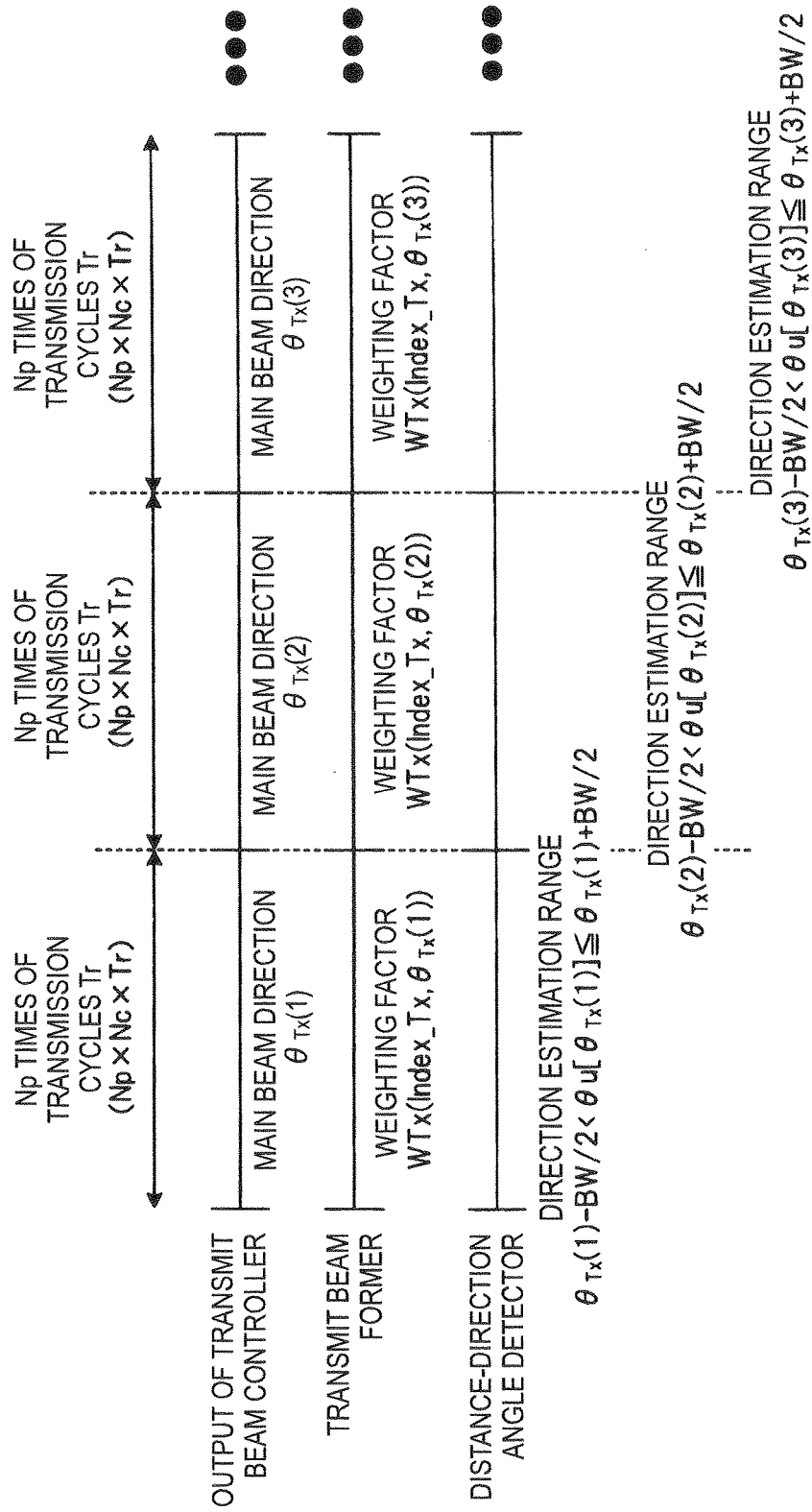
FIG. 12 is a diagram illustrating the relationship between outputs of a transmit beam controller, a transmit beam former and a distance-direction angle detector, and the transmission cycle.

Next, a radar apparatus 1B according to Embodiment 3 will be described with reference to FIG. 11 and FIG. 12. FIG. 11 is a block diagram illustrating in detail the internal configuration of the radar apparatus 1B of Embodiment 3. FIG. 12 is a diagram illustrating the relationship between outputs of a transmit beam controller Be, a transmit beam former 27 and a distance-direction angle detector 24B, and a transmission cycle Tr. The radar apparatus 1B includes a reference signal generator Lo, the transmit beam controller Be, a radar transmitter TxB and a radar receiver RxB.

The radar transmitter TxB includes a transmitting signal generator 2, the transmit beam former 27 and RF transmitters 31, 32, ..., and 3N_Tx in a total number of N_Tx. The respective RF transmitters 31, 32, ..., and 3N_Tx are correspondingly connected to transmission antennas Tx_ant1, Tx_ant2, ..., and Tx_antN_Tx.

The radar receiver RxB includes antenna system processors D1 to D4 in number of, for example, four, a peak frequency selector 21, a adjacent time-frequency component extractor 22, a correlation matrix generating adder 23, and a distance-direction angle detector 24B. Hereinafter, like reference numerals are used to refer to like elements and operations included and performed in the radar apparatus 1B of the present embodiment and in the radar apparatus 1 of Embodiment 1 for omitting or simplifying the description, and differences from the radar apparatus 1 will be herein described.

In the radar apparatus 1B of the present disclosure, the radar transmitter TxB transmits a radar transmitting signal with a main beam direction switched by beam-forming technique, and the radar receiver RxB switches an estimation range for the arrival direction of a reflected wave signal having been reflected on a target in accordance with the main beam direction of the radar transmitting signal.

The transmit beam controller Be controls the main beam direction $\theta_{Tx}$ of the radar transmitting signal transmitted by the radar transmitter TxB. Specifically, the transmit beam controller Be switches, every Np times of transmission cycles Tr, the main beam direction $\theta_{Tx}$ of the radar transmitting signal by every prescribed interval $\Delta\theta_{Tx}$ in a range the same as the estimation range of the arrival direction of the reflected wave signal (see FIG. 12).

During the mth (Np×Nc) times of transmission cycles Tr (Np×Nc×Tr), the transmit beam controller Be outputs a control signal for setting the main beam direction of the radar transmitting signal to $\theta_{Tx}(m)$ to the transmit beam former 27 and the distance-direction angle detector 24B.

In FIG. 12, during the first (Np×Nc) times of transmission cycles Tr (Np×Nc×Tr), the transmit beam controller Be outputs a control signal for setting the main beam direction of the radar transmitting signal to $\theta_{Tx}(1)$ to the transmit beam former 27 and the distance-direction angle detector 24B.

Besides, during the second (Np×Nc) times of transmission cycles Tr (Np×Nc×Tr), the transmit beam controller Be outputs a control signal for setting the main beam direction of the radar transmitting signal to $\theta_{Tx}(2)$ to the transmit beam former 27 and the distance-direction angle detector 24B.

Furthermore, during the third (Np×Nc) times of transmission cycles Tr (Np×Nc×Tr), the transmit beam controller Be outputs a control signal for setting the main beam direction of the radar transmitting signal to $\theta_{Tx}(3)$ to the transmit beam former 27 and the distance-direction angle detector 24B.

The transmit beam former 27 forms, on the basis of a transmitting signal r(k, M) corresponding to an output of the D/A converter 7, a transmit beam having a main beam direction $\theta_{Tx}$ in accordance with the control signal output by the transmit beam controller Be.

Specifically, the transmit beam former 27 multiplies the transmitting signal r(k, M) corresponding to the output of the D/A converter 7 by a weighting factor WTx(Index_Tx, $\theta_{Tx}(m)$) having the 1st to the N_Txth components in a total number of N_Tx. when the respective transmission antennas Tx_ant1 to Tx_antN_Tx are arranged at equal intervals with the element distance d (see FIG. 6), the weighting factor WTx(Index_Tx, $\theta(m)$) is represented by expression (21). Here, λ represents the wavelength of the radar transmitting signal. Although the antennas are assumed to be linearly arranged in the above description, the arrangement of the antennas is not limited to this, but even when the antennas are arranged circularly or elliptically, the weighting factor may be similarly applied by setting it to a value according with the antenna arrangement.

[Expression 21]

$$WTx(\text{Index\_Tx}, \theta_{Tx}(m)) = [\exp[j2\pi((\text{Index\_Tx})-1)d\sin\theta_{Tx}(m)/\lambda]] \quad (21)$$

The transmit beam former 27 outputs transmitting signals in a total number of N_Tx having been respectively multiplied by the weighting factor having the components in a total number of N_Tx respectively to RF transmitters 31 to 3N_Tx corresponding to the ordinal numbers (Index_Tx) of the components of the weighting factor. Here, Index_Tx represents an integer of 1 to N_Tx.

In FIG. 12, during the 1st (Np×Nc) times of transmission cycles (Np×Nc×Tr), the transmit beam former 27 multiplies, in accordance with the control signal output by the transmit beam controller Be, the transmitting signal r(k, M) corresponding to the output of the D/A converter 7 by the weighting factor WTx(Index_Tx, $\theta(1)$).

Besides, during the 2nd (Np×Nc) times of transmission cycles (Np×Nc×Tr), the transmit beam former 27 multiplies, in accordance with the control signal output by the transmit beam controller Be, the transmitting signal r(k, M) corresponding to the output of the D/A converter 7 by the weighting factor WTx(Index_Tx, $\theta(2)$).

Furthermore, during the 3rd (Np×Nc) times of transmission cycles (Np×Nc×Tr), the transmit beam former 27 multiplies, in accordance with the control signal output by the transmit beam controller Be, the transmitting signal r(k, M) corresponding to the output of the D/A converter 7 by the weighting factor WTx(Index_Tx, $\theta(3)$).

Incidentally, the transmit beam former 27 may form a radar transmitting signal having a main beam direction $\theta_{Tx}$ by using a weighting factor including an amplitude component and a phase component, so as to reduce the side lobe of the radar transmitting signal. As a beam forming method for reducing the side lobe, for example, Binomial Array, Chebyshev Array or Taylor Array may be applied.

Each of the RF transmitters 31 to 3N_Tx generates, on the basis of a reference signal generated by the reference signal generator Lo, a transmission reference signal of a carrier frequency band by multiplying the reference signal by prescribed times. Each of the RF transmitters 31 to 3N_Tx is operated on the basis of the transmission reference signal.

The (Index_Tx)th RF transmitter up-converts the baseband transmitting signal into a high frequency radar transmitting signal by using the transmitting signal having been multiplied by the weighting factor WTx(Index_Tx, $\theta_{Tx}(m)$) and the transmission reference signal.

The (Index_Tx)th RF transmitter amplifies the signal level of the radar transmitting signal to a prescribed signal level, and outputs the amplified signal to a transmission antenna connected to the (Index_Tx)th RF transmitter. The radar transmitting signal is emitted to the space from the (Index_Tx)th transmission antenna. Incidentally, the radar transmitting signals in a total number of N_Tx having been transmitted from the transmission antennas in a total number of N_Tx are spatially synthesized to form the radar transmitting signal having the main beam direction $\theta_{Tx}$.

The distance-direction angle detector 24B selects, every (Np×Nc) times of transmission cycles Tr (Np×Nc×Tr), an estimation range $\theta_q[\theta_{Tx}(m)]$ of the azimuth of an arrival direction of a reflected wave signal on the basis of the main beam direction $\theta_{Tx}(m)$ in accordance with the control signal output by the transmit beam controller Be and a range BW substantially corresponding to a transmit beam width (see expression (22)).

The distance-direction angle detector 24B selects, every (Np×Nc) times of transmission cycles Tr, from precedently stored direction vectors $a(\theta_q)$, a direction vector $a(\theta_q[\theta_{Tx}(m)])$ corresponding to the estimation range $\theta_q[\theta_{Tx}(m)]$ of the azimuth selected in accordance with the control signal output by the transmit beam controller Be.

[Expression 22]

$$\theta_{Tx}(m) - \frac{BW}{2} \le \theta_q[\theta_{Tx}(m)] \le \theta_{Tx}(m) + \frac{BW}{2} \quad (22)$$

For example, during the 1st (Np×Nc) times of transmission cycles (Np×Nc×Tr), the distance-direction angle detector 24B selects, in accordance with the control signal output by the transmit beam controller Be, the estimation range $\theta_q[\theta_{Tx}(1)]$ of the azimuth of the arrival direction of the reflected wave signal as a range from "$\theta_{Tx}(1)-BW/2$" to "$\theta_{Tx}(1)+BW/2$".

Besides, during the 2nd (Np×Nc) times of transmission cycles (Np×Nc×Tr), the distance-direction angle detector 24B selects, in accordance with the control signal output by the transmit beam controller Be, the estimation range $\theta_q[\theta_{Tx}(2)]$ of the arrival direction of the reflected wave signal as a range from "$\theta_{Tx}(2)-BW/2$" to "$\theta_{Tx}(2)+BW/2$".

Furthermore, during the 3rd (Np×Nc) times of transmission cycles (Np×Nc×Tr), the distance-direction angle detector 24B selects, in accordance with the control signal output by the transmit beam controller Be, the estimation range $\theta_q[\theta_{Tx}(3)]$ of the arrival direction of the reflected wave signal as a range from "$\theta_{Tx}(3)-BW/2$" to "$\theta_{Tx}(3)+BW/2$".

The distance-direction angle detector 24B calculates, on the basis of the direction vector $a(\theta_q[\theta_{Tx}(m)])$ and the added correlation matrix $R_{sum}(k, f_{peak(k)}, w)$, a direction estimation evaluation function $P_{DOA}(k, f_{peak(k)}, \theta_q[\theta_{Tx}(m)], w)$ by using a prescribed arrival direction estimation algorithm, and outputs the result. Expression (23) corresponds to the direction estimation evaluation function employed when the Capon method is used as an example of the arrival direction estimation algorithm.

[Expression 23]

$$P_{DOA}(k, f_{peak(k)}, \theta_q[\theta_{Tx}(m)], w) = \frac{1}{\{a(\theta_q[\theta_{Tx}(m)])\}^H R_{sum}^{-1}(k, f_{peak(k)}, w) a(\theta_q[\theta_{Tx}(m)])\}} \quad (23)$$

When the main beam direction $\theta_{Tx}$ of the radar transmitting signal to be transmitted by the radar transmitter TxB has been completely switched from $\theta_{min}$ to $\theta_{max}$, the distance-direction angle detector 24B detects, in the range [$\theta_{min}$, $\theta_{max}$] of the azimuth $\theta_q[\theta_{Tx}(m)]$, a maximum value (peak value) of the direction estimation evaluation function $P_{DOA}(k, f_{peak(k)}, \theta_q[\theta_{Tx}(m)], w)$ at every discrete time k. When the maximum value detected at every discrete time k is equal to or larger than a prescribed threshold value, the distance-direction angle detector 24B estimates the azimuth $\theta_q[\theta_{Tx}(m)]$ giving the maximum value at every discrete time k as the arrival direction of the reflected wave signal having been reflected on the target.

The distance-direction angle detector 24B estimates a distance D(k) from a measurement point of the radar apparatus 1B to the target on the basis of the discrete time k corresponding to the maximum value of the direction estimation evaluation function $P_{DOA}(k, f_{peak(k)}, \theta_q[\theta_{Tx}(m)], w)$ in accordance with expression (19).

When the main beam direction $\theta_{Tx}$ ($\theta_{min} \le \theta_{Tx} \le \theta_{max}$) of the radar transmitting signal to be transmitted by the radar transmitter TxB is repeatedly switched from $\theta_{min}$ to $\theta_{max}$, the transmit beam controller Be outputs a control signal for switching the main beam direction $\theta_{Tx}$ from $\theta_{min}$ to $\theta_{max}$ or $\theta_{max}$ to $\theta_{min}$ to the transmit beam former 27 and the distance-direction angle detector 24B, and the operation thereafter is similarly performed.

As described so far, the radar apparatus 1B of the present embodiment has the effect exhibited by the radar apparatus 1 of Embodiment 1, and in addition, estimates an arrival direction of a reflected wave signal in a range in accordance with the main beam direction $\theta_{Tx}$ of the radar transmitting signal set by the transmit beam former 27 in accordance with the control signal output by the transmit beam controller Be and the range BW substantially corresponding to the transmit beam width (see expression (22)).

Thus, the radar apparatus 1B can select an estimation range of an arrival direction of a reflected wave signal by using a range where reception SNR of a reflected wave signal having been reflected on the target is the best, and hence, an error in the direction estimation of the reflected wave signal can be reduced.

Besides, even though there are a plurality of targets equal to or more than the number of receiver antennas within distance resolution of the radar apparatus 1B, since the main beam direction $\theta_{Tx}$ of the radar transmitting signal is switched every Np times of transmission cycles Tr, the radar apparatus 1B can spatially suppress a reflected wave signal having been reflected on a target present out of an estimation range $\theta_u[\theta_{Tx}(m)]$ set in accordance with the main beam direction $\theta_{Tx}$ of the radar transmitting signal and the range BW of the transmit beam width.

Accordingly, the radar apparatus 1B can increase the possibility that the number of reflected wave signals having been reflected on a plurality of targets present within the distance resolution (=C₀×Tp/2) included in the estimation range $\theta_u[\theta_{Tx}(m)]$ set in accordance with the main beam direction $\theta_{Tx}$ of the radar transmitting signal and the range BW of the transmit beam width is smaller in number than the number of receiver antennas, and hence, one or a plurality of targets present within the transmit beam width can be detected with high resolution and high accuracy.

Figure 13:
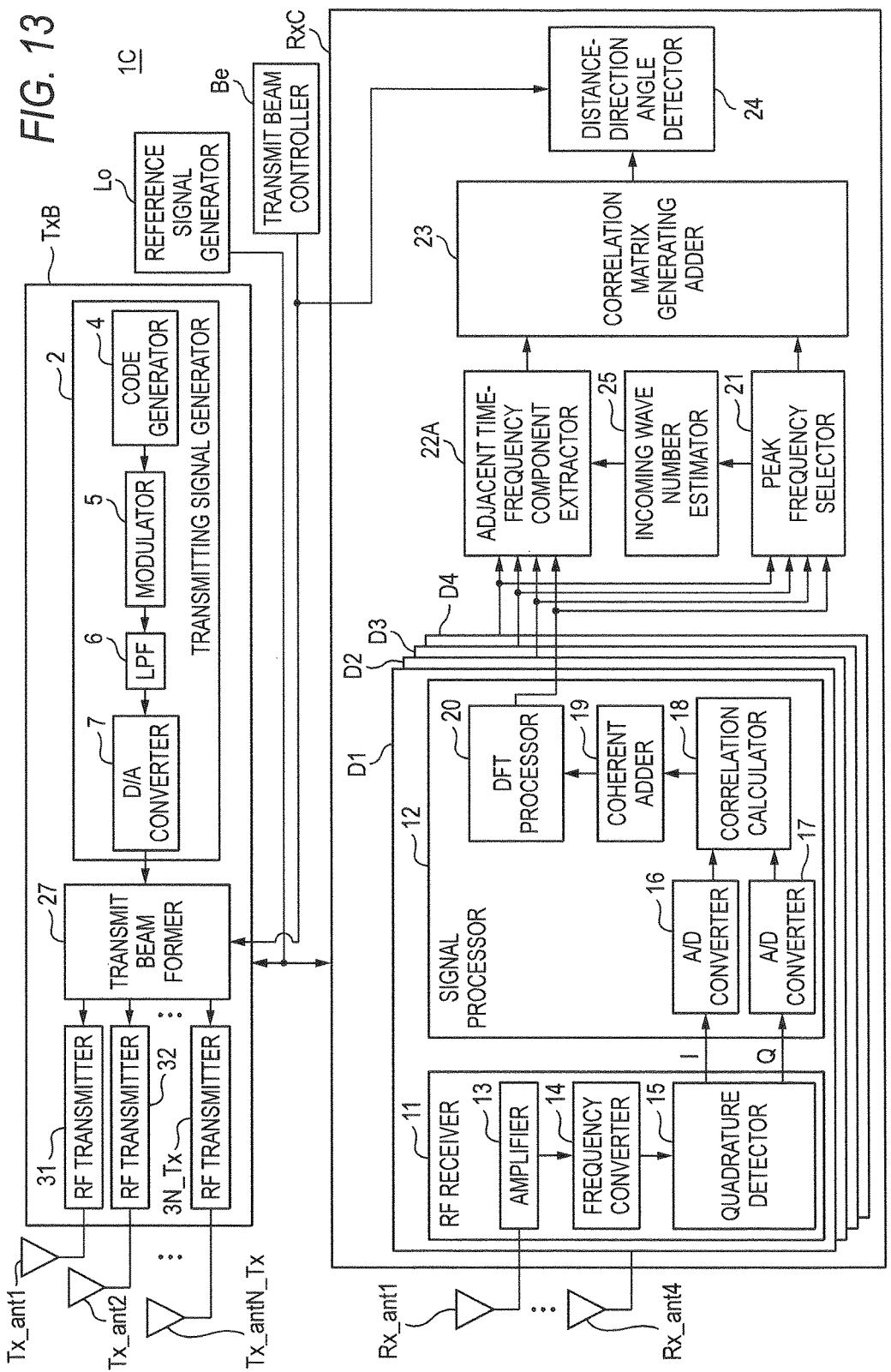
FIG. 13 is a block diagram illustrating in detail the internal configuration of a radar apparatus according to a modification of Embodiment 3.

Incidentally, the radar receiver RxB of the present embodiment may further include the incoming wave number estimator 25 described in Embodiment 2 (see FIG. 13). FIG. 13 is a block diagram illustrating in detail the internal configuration of a radar apparatus 1C according to a modification of Embodiment 3. Thus, the radar apparatus 1C has the effects attained by Embodiments 2 and 3.

(Embodiment 4)

Figure 15:
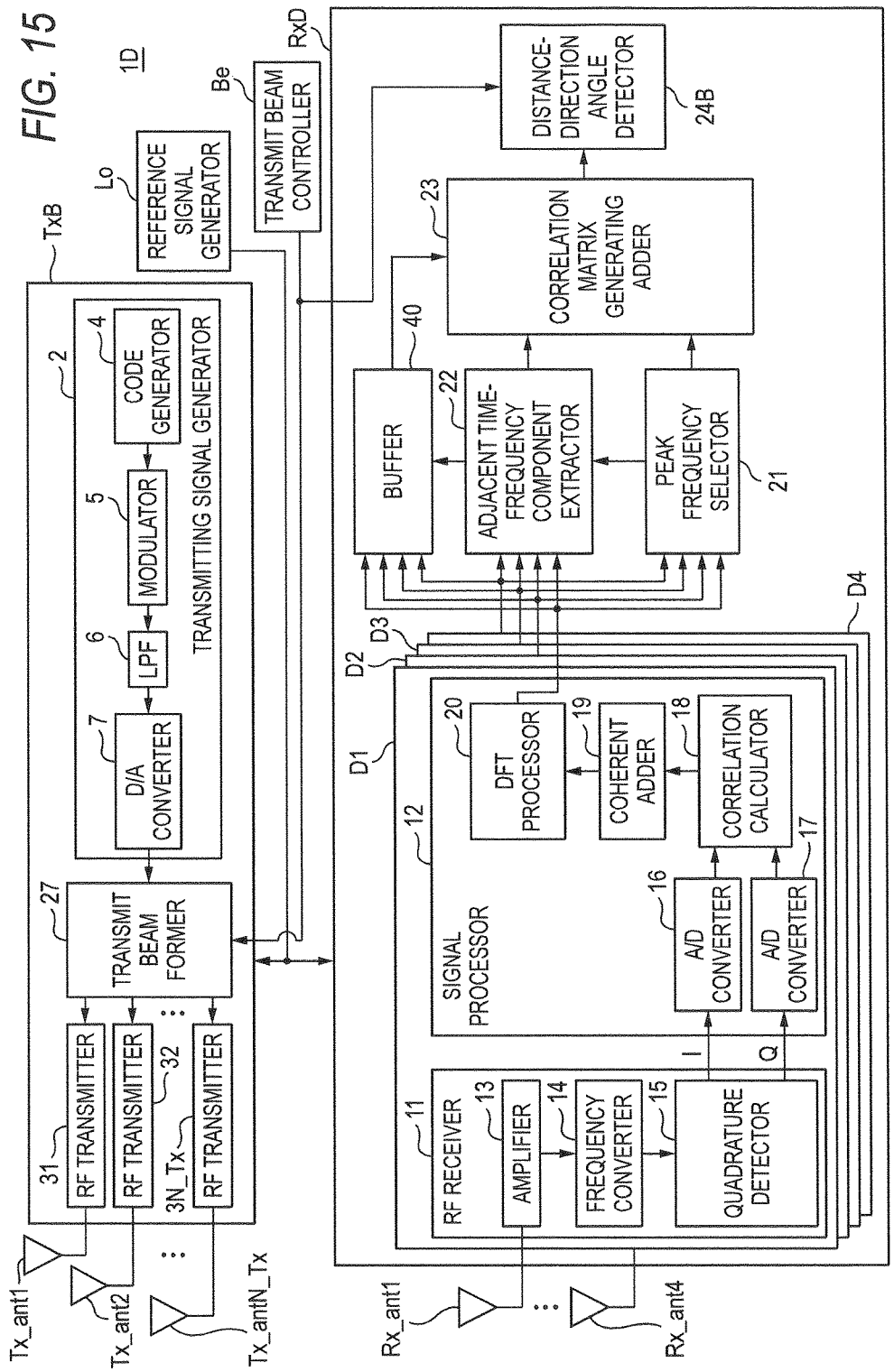
FIG. 15 is a block diagram illustrating in detail the internal configuration of a radar apparatus according to Embodiment 4.

Next, a radar apparatus 1D according to Embodiment 4 will be described with reference to FIG. 15 and FIG. 12. FIG. 15 is a block diagram illustrating in detail the internal configuration of the radar apparatus 1D of Embodiment 4. The radar apparatus 1D of Embodiment 4 has a configuration including a buffer 40 in addition to the radar apparatus 1C of Embodiment 3 (see FIG. 11).

Assuming that a current output result of a DFT processor 20 of each of antenna system processors D1 to D4 is the wth output, the buffer 40 temporality stores a prior (for example, last) correlation vector h (k, $f_s$, w−1) output as the (w−1)th output.

Now, differences from the radar apparatus 1C of Embodiment 3 will be described with the same points as the radar apparatus 1C of Embodiment 3 simplified or omitted.

According to the radar apparatus 1D of the present embodiment, the radar transmitter TxB transmits a radar transmitting signal having a main beam direction switched by the beam-forming technique, and the radar receiver RxD switches an estimation range of the arrival direction of a reflected wave signal having been reflected on a target in accordance with the main beam direction of the radar transmitting signal.

The transmit beam controller Be controls the main beam direction $\theta_{Tx}$ of the radar transmitting signal to be transmitted by the radar transmitter TxB. Specifically, the transmit beam controller Be switches, every (Np×Nc) times of transmission cycles Tr, the main beam direction $\theta_{Tx}$ of the radar transmitting signal by every prescribed interval $\Delta\theta_{Tx}$ (see FIG. 12).

During the wth (Np×Nc) times of transmission cycles Tr (Np×Nc×Tr), the transmit beam controller Be outputs a control signal for setting the main beam direction of the radar transmitting signal to $\theta_{Tx}(w)$ to the transmit beam former 27 and the distance-direction angle detector 24B.

The transmit beam former 27 forms, on the basis of a transmitting signal r(k, M) corresponding to an output of the D/A converter 7, a transmit beam having a main beam direction $\theta_{Tx}$ in accordance with the control signal output by the transmit beam controller Be.

Specifically, the transmit beam former 27 multiplies the transmitting signal r(k, M) corresponding to the output of the D/A converter 7 by a weighting factor WTx(Index_Tx, $\theta_{Tx}(w)$) having the 1st to the N_Txth components in a total number of N_Tx. When the respective transmission antennas Tx_ant1 to Tx_antN_Tx are arranged at equal intervals with the element distance d (see FIG. 6), the weighting factor WTx(Index_Tx, $\theta(w)$) is represented by expression (24). Here, λ represents the wavelength of the radar transmitting signal. Although the antennas are assumed to be linearly arranged in the above description, the arrangement of the antennas is not limited to this, but even when the antennas are arranged circularly or elliptically, the weighting factor may be similarly applied by setting it to a value according with the antenna arrangement.

[Expression 24]

$$WTx(\text{Index\_Tx}, \theta_{Tx}(w)) = [\exp[j2\pi((\text{Index\_Tx}) - 1)d\sin\theta_{Tx}(w)/\lambda]] \quad (24)$$

The transmit beam former 27 outputs transmitting signals in a total number of N_Tx having been respectively multiplied by the weighting factor having the components in a total number of N_Tx respectively to RF transmitters 31 to 3N_Tx corresponding to the ordinal numbers (Index_Tx) of the components of the weighting factor. Here, Index_Tx represents an integer of 1 to N_Tx.

Incidentally, the transmit beam former 27 may form a radar transmitting signal having a main beam direction $\theta_{Tx}$ by using a weighting factor including an amplitude component and a phase component, so as to reduce the side lobe of the radar transmitting signal. As a beam forming method for reducing the side lobe, for example, Binomial Array, Chebyshev Array or Taylor Array may be applied.

Each of the RF transmitters 31 to 3N_Tx generates, on the basis of a reference signal generated by a reference signal generator Lo, a transmission reference signal of a carrier frequency band by multiplying the reference signal by prescribed times. Each of the RF transmitters 31 to 3N_Tx is operated on the basis of the transmission reference signal.

The (Index_Tx)th RF transmitter up-converts the baseband transmitting signal into a high frequency radar transmitting signal by using the transmitting signal having been multiplied by the weighting factor WTx(Index_Tx, $\theta_{Tx}(w)$) and the transmission reference signal.

The (Index_Tx)th RF transmitter amplifies the signal level of the radar transmitting signal to a prescribed signal level, and outputs the amplified signal to a transmission antenna connected to the (Index_Tx)th RF transmitter. The radar transmitting signal is emitted to the space from the (Index_Tx)th transmission antenna. Incidentally, the radar transmitting signals in a total number of N_Tx having been transmitted from the transmission antennas in a total number of N_Tx are spatially synthesized to form the radar transmitting signal having the main beam direction $\theta_{Tx}(w)$.

The distance-direction angle detector 24B selects, every (Np×Nc) times of transmission cycles Tr (Np×Nc×Tr), an estimation range $\theta_q[\theta_{Tx}(w)]$ of the azimuth of an arrival direction of a reflected wave signal on the basis of the main beam direction $\theta_{Tx}(w)$ set in accordance with the control signal output by the transmit beam controller Be and a range BW substantially corresponding to a transmit beam width (see expression (25)).

The distance-direction angle detector 24B selects, every (Np×Nc) times of transmission cycles Tr, from precedently stored direction vectors a($\theta_q$), a direction vector a($\theta_q[\theta_{Tx}(w)]$) corresponding to the estimation range $\theta_q[\theta_{Tx}(m)]$ of the azimuth selected in accordance with the control signal output by the transmit beam controller Be.

[Expression 25]

$$\theta_{Tx}(w) - \frac{BW}{2} \le \theta_q[\theta_{Tx}(w)] \le \theta_{Tx}(w) + \frac{BW}{2} \quad (25)$$

The buffer 40 temporarily stores a correlation vector $h(k, f_s, w-1)$ corresponding to the (w−1)th output of the DFT processor 20 of each of the antenna system processors D1 to D4. Here, k represents 1 to $((Nr+Nu) \times Ns/No)$; $f_s$ represents $-NF \times \alpha_f, \ldots, 0, \ldots$, or $Nf \times \alpha_f$; and $\alpha_f$ represents a constant corresponding to a Doppler frequency interval.

The correlation matrix generating adder 23 generates, on the basis of correlation vectors in a total number of $(2NE+1) \times (2NT+1)$, including one correlation vector $h(k, f_s, w)$ selected by the peak frequency selector 21 and correlation vectors in number of $(2NE+1) \times \{(2NT+1)-1\}$ extracted by the adjacent time-frequency component extractor 22, correlation matrixes corresponding to correlation of reflected wave signals (received signals) received by the respective receiver antennas. The correlation matrix generating adder 23 adds up the generated correlation matrixes so as to calculate an added correlation matrix $R_{sum}(k, f_{peak(k)}, w)$ in accordance with expression (26), expression (27) or expression (13), and outputs the calculated matrix to the distance-direction angle detector 24. In expression (26) and expression (27), a superscript H represents complex conjugate transpose.

[Expression 26]

$$R_{sum}(k, f_{peak(k)}, w) = \quad (26)$$

$$\frac{1}{2(2NT+1)(2NE+1)} \left\{ \sum_{u=-NT}^{NT} \sum_{v=-NF}^{NF} h(k+u, f_{peak(k)} + \alpha_f v, w) \right.$$

$$h(k+u, f_{peak(k)} + \alpha_f v, w)^H +$$

$$\sum_{u=-NT}^{NT} \sum_{v=-NF}^{NF} h(k+u, f_{peak(k)} + \alpha_f v, w-1)$$

$$\left. h(k+u, f_{peak(k)} + \alpha_f v, w-1)^H \right\}$$

[Expression 27]

$$R_{sum}(k, f_{peak(k)}, w) = \quad (27)$$

$$\frac{1}{2(2NT+1)(2NE+1)} \left\{ \sum_{u=-NT}^{NT} \sum_{v=-NF}^{NF} wc_{uv} h(k+u, f_{peak(k)} + \alpha_f v, w) \right.$$

$$h(k+u, f_{peak(k)} + \alpha_f v, w)^H +$$

$$\sum_{u=-NT}^{NT} \sum_{v=-NF}^{NF} wc_{uv} h(k+u, f_{peak(k)} + \alpha_f v, w-1)$$

$$\left. h(k+u, f_{peak(k)} + \alpha_f v, w-1)^H \right\}$$

The distance-direction angle detector 24B calculates, on the basis of a direction vector $a(\theta_q[\theta_{Tx}(w)])$ and the added correlation matrix $R_{sum}(k, f_{peak(k)}, w)$, a direction estimation evaluation function $P_{DOA}(k, f_{peak(k)}, \theta_q[\theta_{Tx}(w)], w)$ by using a prescribed arrival direction estimation algorithm (such as the MUSIC method or the Capon method), and outputs the result. Expression (28) corresponds to the direction estimation evaluation function employed when the Capon method is used as an example of the arrival direction estimation algorithm.

[Expression 28]

$$P_{DOA}(k, f_{peak(k)}, \theta_q[\theta_{Tx}(w)], w) = \quad (28)$$

$$\frac{1}{\{a(\theta_q[\theta_{Tx}(w)])^H R_{sum}^{-1}(k, f_{peak(k)}, w) a(\theta_q[\theta_{Tx}(w)])\}}$$

When the main beam direction $\theta_{Tx}$ of the radar transmitting signal to be transmitted by the radar transmitter TxB has been completely switched from $\theta_{min}$ to $\theta_{max}$, the distance-direction angle detector 24B detects, in the range $[\theta_{min}, \theta_{max}]$ of the azimuth $\theta_q[\theta_{Tx}(m)]$, a maximum value (peak value) of the direction estimation evaluation function $P_{DOA}(k, f_{peak(k)}, \theta_q[\theta_{tx}(w)], w)$ at every discrete time k. When the maximum value detected at every discrete time k is equal to or larger than a prescribed threshold value, the distance-direction angle detector 24B estimates the azimuth $\theta_q[\theta_{Tx}(w)]$ giving the maximum value at every discrete time k as the arrival direction of the reflected wave signal having been reflected on the target.

The distance-direction angle detector 24B estimates a distance D(k) from a measurement point of the radar apparatus 1B to the target on the basis of the discrete time k corresponding to the maximum value of the direction estimation evaluation function $P_{DOA}(k, f_{peak(k)}, \theta_q[\theta_{tx}(w)], w)$ in accordance with expression (19).

When the main beam direction $\theta_{Tx}$ ($\theta_{min} \leq \theta_{Tx} \leq \theta_{max}$) of the radar transmitting signal to be transmitted by the radar transmitter TxB is repeatedly switched from $\theta_{min}$ to $\theta_{max}$, the transmit beam controller Be outputs a control signal for switching the main beam direction $\theta_{Tx}$ from $\theta_{min}$ to $\theta_{max}$ or $\theta_{max}$ to $\theta_{min}$ to the transmit beam former 27 and the distance-direction angle detector 24B, and the operation thereafter is similarly performed.

As described so far, the radar apparatus 1D of the present embodiment has the effect exhibited by the radar apparatus 1 of Embodiment 1, and furthermore, a range in accordance with the main beam direction $\theta_{Tx}$ of the radar transmitting signal set by the transmit beam former 27 in accordance with the control signal output by the transmit beam controller Be and the range BW substantially corresponding to the transmit beam width (see expression (25)) is employed, and in addition, the correlation matrix generating adder adds up also a correlation matrix obtained in the adjacent transmit beam direction $\theta_{Tx} + \Delta \theta_{Tx}$, and then, the direction estimation evaluation function by the arrival direction estimation algorithm is calculated and output. Therefore, even though a plurality of waves arrive, an effect to improve the separation performance for angular directions when a plurality of waves arrive can be attained owing to an effect of spatial averaging of correlation matrixes.

Incidentally, it is assumed in the above description that the buffer 40 temporarily stores the correlation vector $h(k, f_s, w-1)$ corresponding to the (w−1)th output of the DFT processor 20 of each of the antenna system processors D1 to D4, which does not limit the disclosure, but the buffer 40 may store a correlation vector corresponding to a further prior output, such as a correlation vector $h(k, f_s, w-2)$ corresponding to the (w−2)th output, so that the correlation matrix generating adder 23 may perform the addition process for correlation matrixes obtained from the correlation vector corresponding to the further prior output. In this case, although a buffer capacity necessary for the buffer 40 is increased, the effect of spatially averaging the correlation matrixes is further increased, and hence, an effect of further improving the separation performance for the angular direction when a plurality of waves arrive can be attained.

As a result, the radar apparatus 1D can select an estimation range for an arrival direction of a reflected wave signal by using a range where the reception SNR of a reflected wave signal having been reflected on a target is the best, and hence an error in the direction estimation of the reflected wave signal can be reduced.

Besides, even though there are a plurality of targets equal to or more than the number of receiver antennas within distance resolution of the radar apparatus 1D, since the main beam direction θTx of the radar transmitting signal is switched every Np times of transmission cycles Tr, the radar apparatus 1D can spatially suppress a reflected wave signal having been reflected on a target present out of an estimation range $\theta_u[\theta_{Tx}(w)]$ set in accordance with the main beam direction $\theta_{Tx}$ of the radar transmitting signal and the transmit beam width (the range BW).

Accordingly, the radar apparatus 1D can increase the possibility that the number of reflected wave signals having been reflected on a plurality of targets present within the distance resolution ($=C_0 \times Tp/2$) included in the estimation range $\theta_u[\theta_{Tx}(m)]$ set in accordance with the main beam direction $\theta_{Tx}$ of the radar transmitting signal and the transmit beam width (range BW) is smaller in number than the number of receiver antennas, and hence, one or a plurality of targets present within the transmit beam width can be detected with high resolution and high accuracy.

Figure 16:
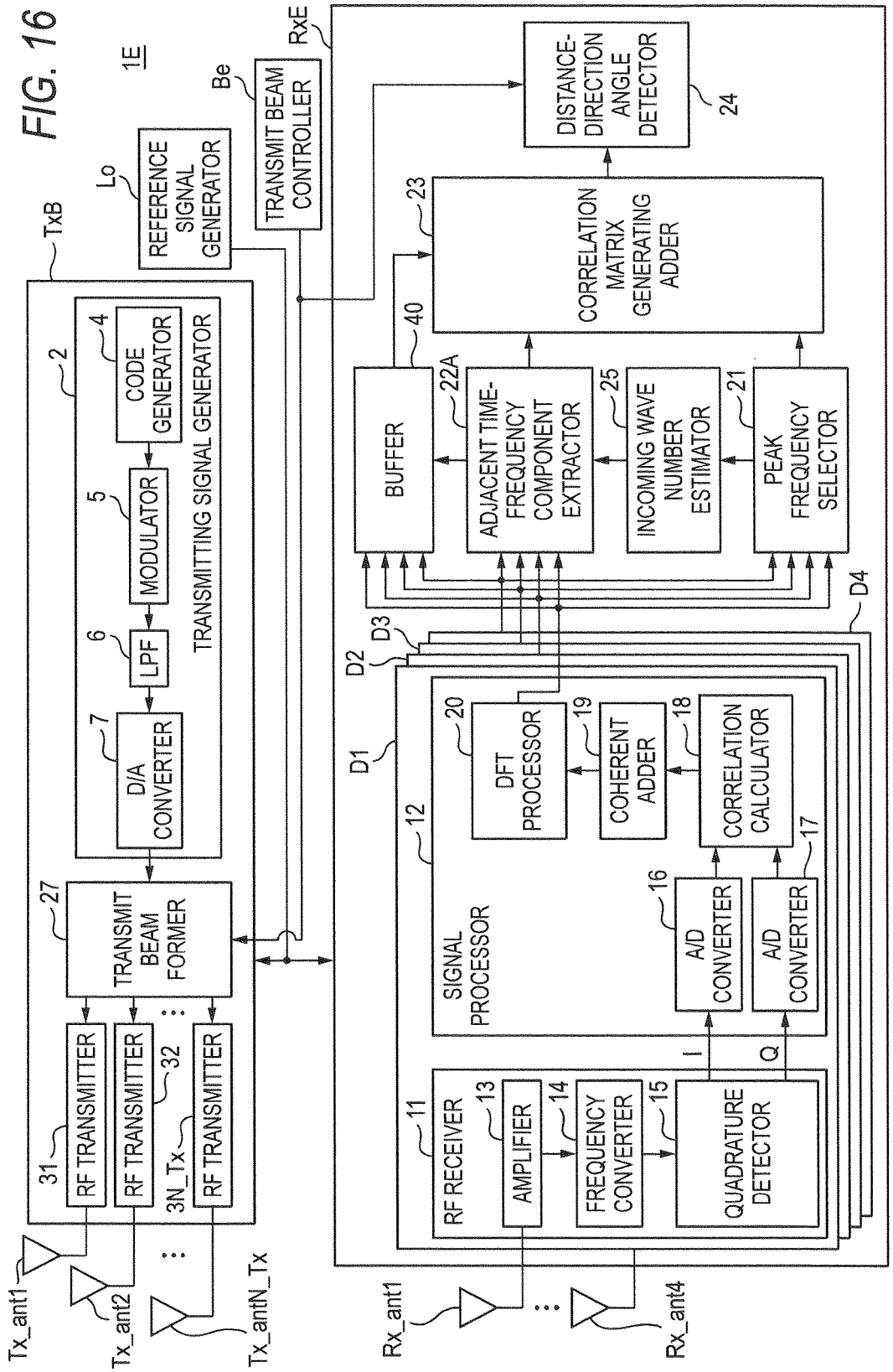
FIG. 16 is a block diagram illustrating in detail the internal configuration of a radar apparatus according to a modification of Embodiment 4.

Incidentally, the radar receiver RxD of the present embodiment may further include the incoming wave number estimator 25 described in Embodiment 2 (see the radar receiver RxE of FIG. 16). FIG. 16 is a block diagram illustrating in detail the internal configuration of a radar apparatus 1E according to a modification of Embodiment 4. Thus, the radar apparatus 1E has the effects attained by Embodiments 2 and 4.

The various embodiments have been described so far with reference to the accompanying drawings, and it goes without saying that the present disclosure is not limited to these embodiments. Those skilled in the art can obviously conceive various changes and modifications within the scope of the appended claims, and it is understood that such changes and modifications are within the scope of the technical spirit of the present disclosure.

The present disclosure is based on Japanese Patent Application filed on Jun. 13, 2013 (Japanese Patent Application No. 2013-124978), the whole contents of which are incorporated herein by reference.

INDUSTRIAL APPLICABILITY

The present disclosure is useful as a radar apparatus in which, even though a plurality of reflected waves are received, azimuth estimation accuracy for the plural reflected waves can be improved by securing the rank of a correlation matrix without degrading coherent additional gain.

DESCRIPTION OF REFERENCE NUMERALS 1, 1A, 1B, 1C radar apparatus
2 transmitting signal generator
3, 31, 32, 3N_Tx RF transmitter
4 code generator
5 modulator
6 LPF
7 D/A converter
8, 14 frequency converter
9, 13 amplifier
11 RF receiver
12 signal processor
15 quadrature detector
16, 17 A/D converter
18 correlation calculator
19 coherent adder
20 DFT processor
21 peak frequency selector
22, 22A adjacent time-frequency component extractor
23 correlation matrix generating adder
24, 24B distance-direction angle detector
25 incoming wave number estimator
27 transmit beam former
Be transmit beam controller
D1, D2, D3, D4 antenna system processor
Lo reference signal generator
Rx, RxA, RxB, RxC radar receiver
Tx, TsB radar transmitter

The invention claimed is:

1. A radar apparatus comprising:
a radar transmitter that converts a transmitting signal into a high frequency radar transmitting signal and transmits the radar transmitting signal from a transmission antenna; and
a radar receiver that receives, by a plurality of receiver antennas, a reflected wave signal corresponding to the radar transmitting signal having been reflected on a target, and estimates an arrival direction of the reflected wave signal by using a plurality of antenna system processors for generating signals including correlation vectors between the reflected wave signal and the transmitting signal,
wherein the radar receiver includes:
a correlation vector extractor that extracts a maximum value of the signals including the correlation vectors, and the signals including the correlation vectors in number of (NE×NT−1) corresponding to Doppler frequency components in number of NE (wherein NE represents an integer of 1 or more) and corresponding to time components in number of NT (wherein NT represents an integer of 1 or more) respectively adjacent to a Doppler frequency and a time giving the maximum value; and
a correlation matrix generator that generates, on the basis of the extracted signals including the correlation vectors in number of (NE×NT), a correlation matrix corresponding to correlation of the reflected wave signal received by the plurality of receiver antennas.

2. The radar apparatus according to claim 1, further comprising:
a distance direction detector that calculates an evaluation function in accordance with the correlation matrix and a direction vector including information of differences in an amplitude and a phase caused depending on an azimuth of the arrival direction of the reflected wave signal, and estimates a distance or an azimuth from the radar apparatus to the target on the basis of a maximum value of the evaluation function.

3. The radar apparatus according to claim 1, wherein the correlation matrix generator generates the correlation matrix by using the extracted correlation vectors in number of (NE×NT) and a prescribed weighting factor.

4. The radar apparatus according to claim 1, further comprising:

an incoming wave number estimator that estimates the number of incoming waves of the reflected wave signal on the basis of a maximum value of the signals including the correlation vectors.

5. The radar apparatus according to claim 4, wherein the correlation vector extractor changes, in accordance with an estimation result of the number of the incoming waves of the reflected wave signal, the number NE of the Doppler frequency components to be extracted of the signals including the correlation vectors and the number NT of the time components to be extracted of the signals including the correlation vectors.

6. The radar apparatus according to claim 1, wherein the correlation vector extractor changes the numbers NE and NT of the signals including the correlation vectors to be extracted in accordance with a signal spread of a maximum value of the Doppler frequency components or the time components of the signals including the correlation vectors.

7. The radar apparatus according to claim 2, further comprising:
a transmit beam controller that outputs a control signal for switching a main beam direction of the radar transmitting signal every prescribed number of times of transmission cycles,
wherein the radar transmitter transmits the radar transmitting signal having the main beam direction switched in accordance with the control signal.

8. The radar apparatus according to claim 7, wherein the distance direction detector selects, as a calculation range of the evaluation function, a range substantially corresponding to a beam width of the radar transmitting signal to which the main beam direction is switched.

9. The radar apparatus according to claim 1, wherein the antenna system processor includes:
a receiver antenna;
a correlation calculator that calculates a correlation value between the reflected wave signal received by the receiver antenna and the transmitting signal at every transmission cycle of the radar transmitting signal;
a first coherent adder that performs a first coherent addition of the correlation value over a first prescribed number of the transmission cycles; and
an adder that performs a second coherent addition of the first coherent addition result inclusively of phase variation in accordance with a prescribed number of different Doppler frequency components over a second prescribed number of the transmission cycles.

10. The radar apparatus according to claim 1, further comprising:
a buffer that temporarily stores a prior one of the correlation vectors generated by the plurality of antenna system processors.

* * * * *